(12) United States Patent
Siomina et al.

(10) Patent No.: US 11,889,457 B2
(45) Date of Patent: Jan. 30, 2024

(54) SRS SWITCHING FOR UL POSITIONING SIGNAL TRANSMISSION

(71) Applicant: Telefonaktiebolaget LM Ericsson (publ), Stockholm (SE)

(72) Inventors: Iana Siomina, Täby (SE); Ritesh Shreevastav, Upplands Väsby (SE); Florent Munier, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 422 days.

(21) Appl. No.: 17/290,788

(22) PCT Filed: Oct. 25, 2019

(86) PCT No.: PCT/SE2019/051055
§ 371 (c)(1),
(2) Date: May 3, 2021

(87) PCT Pub. No.: WO2020/091656
PCT Pub. Date: May 7, 2020

(65) Prior Publication Data
US 2021/0392609 A1    Dec. 16, 2021

Related U.S. Application Data

(60) Provisional application No. 62/754,609, filed on Nov. 2, 2018.

(51) Int. Cl.
*H04W 64/00*     (2009.01)
*G01S 5/02*      (2010.01)

(52) U.S. Cl.
CPC .......... *H04W 64/00* (2013.01); *G01S 5/0226* (2013.01)

(58) Field of Classification Search
CPC ..... H04W 64/00; H04W 24/10; G01S 5/0226; G01S 5/0236; H04L 5/0051; H04L 5/0053; H04L 5/0092; H04L 27/261
See application file for complete search history.

(56) References Cited

U.S. PATENT DOCUMENTS 8,767,608 B2 *   7/2014   Josiam .................. H04L 5/0098
                                                             370/312
2012/0083278 A1   4/2012   Kazmi et al.
(Continued)

FOREIGN PATENT DOCUMENTS

WO       2018063075 A1    4/2018
WO       2018069311 A1    4/2018
(Continued)

OTHER PUBLICATIONS

"3GPP TS 38.331 V15.3.0", 3rd Generation Partnership Project; Technical Specification Group Radio Access Network; NR; Radio Resource Control (RRC) protocol specification (Release 15), Sep. 2018, pp. 1-445.
(Continued)

*Primary Examiner* — Kabir A Timory
(74) *Attorney, Agent, or Firm* — Murphy, Bilak & Homiller, PLLC

(57) ABSTRACT

A method performed by a User Equipment (UE) for transmitting Uplink (UL) signals for positioning purpose in a wireless communications network is provided. The UE receives (302) from a second network node, a UL signal switching configuration, and a UL signal configuration to transmit UL signals for positioning purpose on one or more carriers where the UE does not transmit user data. The UE further receives (303) from the second network node a UL signal switching order. The UE then switches (304) to at least one carrier where the UE does not transmit user data,
(Continued)

to transmit the UL signals for positioning purpose. The UE then switches back (305) to a carrier where the UE transmits user data.

12 Claims, 14 Drawing Sheets

(56) References Cited

U.S. PATENT DOCUMENTS

2015/0056933 A1 2/2015 Yan et al.
2018/0007707 A1 1/2018 Rico Alvarino et al.

FOREIGN PATENT DOCUMENTS

| WO | 2018081597 A1 | 5/2018 |
| WO | 2018083631 A1 | 5/2018 |
| WO | 2018124259 A1 | 7/2018 |

OTHER PUBLICATIONS

"3GPP TS 38.212 V15.7.0", 3rd Generation Partnership Project; Technical Specification Group Radio Access Network; NR; Multiplexing and channel coding (Release 15), Sep. 2019, pp. 1-101.
"3GPP TS 38.213 V15.7.0", 3rd Generation Partnership Project; Technical Specification Group Radio Access Network; NR; Physical layer procedures for control (Release 15), Sep. 2019, pp. 1-108.
"3GPP TS 38.214 V15.7.0", 3rd Generation Partnership Project; Technical Specification Group Radio Access Network; NR; Physical layer procedures for data (Release 15), Sep. 2019, pp. 1-106.
"Potential Techniques for NR Positioning", 3GPP TSG RAN WG1 Meeting #94bis; R1-1810855; Chengdu, China, Oct. 8-12, 2018, pp. 1-6.

* cited by examiner

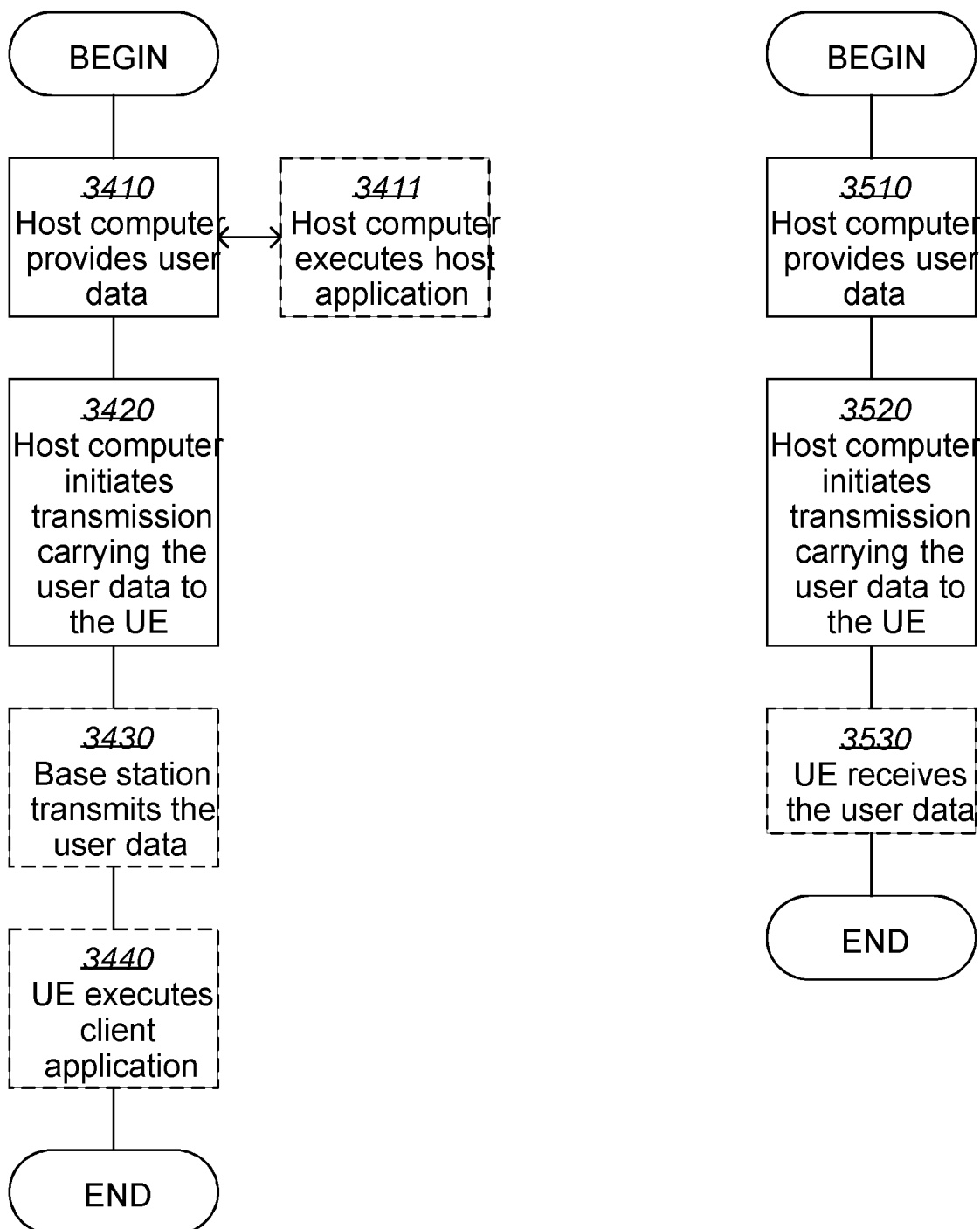

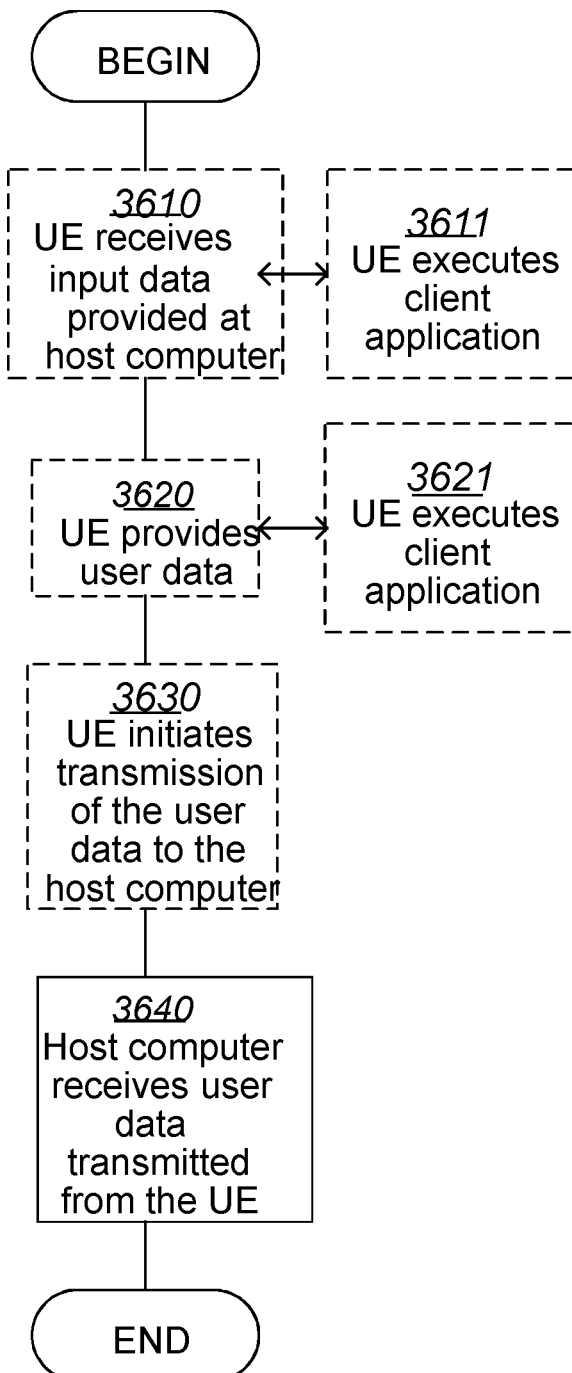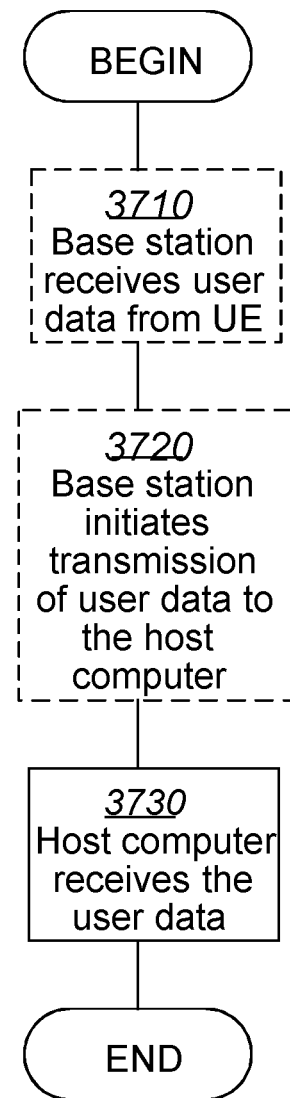
FIG. 15
FIG. 16

SRS SWITCHING FOR UL POSITIONING SIGNAL TRANSMISSION

TECHNICAL FIELD

Embodiments herein relate to network nodes, a User Equipment (UE), and methods therein. In particular, they relate to handling Uplink (UL) signals to be transmitted by the UE for positioning purpose in a wireless communications network.

BACKGROUND

In a typical wireless communication network, wireless devices, also known as wireless communication devices, mobile stations, stations (STA) and/or UEs, communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) or new generation, (NG or ng). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

UE Positioning

Positioning has been a topic in LTE standardization since 3GPP Release 9. A primary objective is to fulfill regulatory requirements for emergency call positioning. Positioning in NR is proposed to be supported by the architecture shown in FIG. 1. A Location Management Function (LMF) is the location server in NR. There are also interactions between the location server and the gNodeB via the NR Positioning Protocol (NRPP) protocol. The interactions between the gNodeB and the device are supported via the Radio Resource Control (RRC) protocol. E-SMLC is the abbreviation for Evolved Serving Mobile Location Centre, and AMF is the abbreviation for Access and Mobility Management Function.

Note 1: The gNB and ng-eNB may not always both be present.

Note 2: When both the gNB and ng-eNB are present, the NG-C interface is only present for one of them. FIG. 1 depicts NG-RAN Rel-15 LCS Protocols.

In the legacy LTE standards, the following techniques are supported:

Enhanced Cell ID. Essentially cell ID information to associate the device to the serving area of a serving cell, and then additional information to determine a finer granularity position.

Assisted Global Navigation Satellite System (GNSS). GNSS information retrieved by the device, supported by assistance information provided to the device from E-SM LC Observed Time Difference of Arrival (OTDOA). The device estimates the time difference of reference signals from different base stations and sends to the E-SMLC for multi-lateration.

Uplink Time Difference of Arrival (UTDOA). The device is requested to transmit a specific waveform that is detected by multiple location measurement units (e.g. an eNB) at known positions. These measurements are forwarded to E-SMLC for multilateration NR as compared to its previous predecessor, LTE/UMTS, provides more flexibility and allows more dynamic change, for instance by considering UE movements and fast changing radio propagation models. Many physical channels are being introduced in a more dynamic fashion.

In NR, positioning has not yet been specified but some of the reference signals specified for other purposes could also be utilized for positioning. As an example in DL, the Channel State Information (CSI) reference Signals (RS) for tracking could be utilized for Time of Arrival (TOA) measurements, while SRS are candidates for NR UL positioning Demodulation Reference Signal (DMRS) is used to estimate the radio channel for demodulation. DMRS is UE-specific, can be beamformed, confined in a scheduled resource, and transmitted only when necessary, both in DL and UL. To support multiple-layer MIMO transmissions, multiple orthogonal DMRS ports may be scheduled, one for each layer. Orthogonality is achieved by Frequency Division Multiplexing (FDM), comb structure, and Time Division Multiplexing (TDM) and Code Division Multiplexing (CDM), with cyclic shift of the base sequence or orthogonal cover codes. The basic DMRS pattern is front loaded, as the DMRS design takes into account the early decoding requirement to support low-latency applications. For low-speed scenarios, DMRS uses low density in the time domain. However, for high-speed scenarios, the time density of DMRS is increased to track fast changes in the radio channel.

Phase-Tracking Reference Signal (PTRS) is introduced in NR to enable compensation of oscillator phase noise. Typically, phase noise increases as a function of oscillator carrier frequency. PTRS may therefore be utilized at high carrier frequencies, such as mmWave, to mitigate phase noise. One of the main degradations caused by phase noise in an OFDM signal is an identical phase rotation of all the subcarriers, known as Common Phase Error (CPE). PTRS is designed so that it has low density in the frequency domain and high density in the time domain, since the phase rotation produced by CPE is identical for all subcarriers within an OFDM symbol, but there is low correlation of phase noise across OFDM symbols. PTRS is UE-specific, confined in a scheduled resource and can be beamformed. The number of PTRS ports may be lower than the total number of ports, and orthogonality between PTRS ports is achieved by means of FDM. PTRS is configurable depending on the quality of the oscillators, carrier frequency, OFDM subcarrier spacing, and modulation and coding schemes used for transmission.

A Sounding Reference Signal (SRS) is transmitted in UL to perform CSI measurements mainly for scheduling and link adaptation. For NR, it is expected that the SRS will also be utilized for reciprocity-based precoder design for massive MIMO and UL beam management. It is likely that the SRS will have a modular and flexible design to support different procedures and UE capabilities.

Timing Advance (TA): The timing advance calculation in order to achieve synchronization in UL may be taken into consideration also for positioning estimation. When multiple UEs are transmitting on the same physical channel, the correct time is needed to send so that data arrives to base station on the correct timeslot. The UE and Bas Station (BS) do initial synchronization on Random Access Channel (RACH) using zero timing advance. After this the BS informs the UE about the value of TA that it needs to apply before transmitting in UL.

SRS Switching

In LTE, a Carrier aggregation (CA)-capable UE can receive simultaneously on a number of component carriers (CCs) in DL, but in general the UE can transmit simultaneously on only a much smaller number of carriers in UL (typically one) for the transmissions of physical uplink control channel (PUCCH), physical uplink shared channel (PUSCH), and SRS. For this reason, before Release 14, a Time Division Duplex (TDD) Component Carrier (CC) of the UE may be configured as a DL-only CC and not have corresponding SRS in UL, which may be referred to as PUSCH-less TDD CC, and hence DL beamforming on this CC cannot exploit channel reciprocity based on sounding. To improve the DL beamforming performance, support for SRS transmissions on all configured TDD CCs, including on PUSCH-less TDD CCs, is allowed in Release 14 via the introduction of SRS switching, while ensuring that the UE's UL CA capability is not exceeded at any point in time. In addition to the configuration of PUCCH/PUSCH/SRS on CCs with full UL, the network also configures SRS on PUSCH-less TDD CCs. When such SRS needs to be transmitted, the UE temporarily suspends the UL transmission on a CC configured with PUSCH, switches to a PUSCH-less TDD CC, transmits SRS on the CC in an UL subframe or in the special subframe, and then switches back.

Similar to LTE, SRS switching was also introduced in NR. The UE is configured to perform SRS switching by means of SRS-CarrierSwitching Information Element (IE) via higher layer protocol such as RRC:

```
SRS-CarrierSwitching ::=           SEQUENCE {
    srs-SwitchFromServCellIndex        INTEGER (0..31)
OPTIONAL,       -- Need M
    srs-SwitchFromCarrier              ENUMERATED {sUL,
                                       nUL},
    srs-TPC-PDCCH-Group                CHOICE {
        typeA                              SEQUENCE (SIZE
(1..32)) OF SRS-TPC-PDCCH-Config,
        typeB                              SRS-TPC-PDCCH-
Config
    }
OPTIONAL,       -- Need M
    monitoringCells                    SEQUENCE (SIZE
(1..maxNrofServingCells)) OF ServCellIndex
OPTIONAL,       -- Need M
    ...
}
``` monitoringCells
A set of serving cells for monitoring Physical Downlink Control Channel (PDCCH) conveying SRS DCI format with Cyclic Redundancy Check (CRC) scrambled by Transmit Power Control (TPC)-SRS- Radio Network Temporary Identifier (RNTI) Corresponds to L1 parameter 'SRS-monitoring-cells' (see 38.212, 38.213, section 7.3.1, 11.3)
srs-SwitchFromServCellIndex
Indicates the serving cell whose UL transmission may be interrupted during SRS transmission on a PUSCH-less cell. During SRS transmission on a PUSCH-less cell, the UE may temporarily suspend the UL transmission on a serving cell with PUSCH in the same CG to allow the PUSCH-less cell to transmit SRS. (see 38.214, section 6.2.1.3)
srs-TPC-PDCCH-Group
Network configures the UE with either typeA-SRS-TPC-PDCCH-Group or typeB-SRS-TPC-PDCCH-Group, if any.
typeA
Type A trigger configuration for SRS transmission on a PUSCH-less SCell. Corresponds to L1 parameter 'typeA-SRS-TPC-PDCCH-Group' (see 38.212, 38.213, section 7.3.1, 11.3)
typeB
Type B trigger configuration for SRS transmission on a PUSCH-less SCell. Corresponds to L1 parameter 'typeB-SRS-TPC-PDCCH-Config' (see 38.212, 38.213, section 7.3.1, 11.3)

SUMMARY

An object of embodiments herein is to improve the performance of a wireless communications network.

According to an aspect of embodiments herein, the object is achieved by a method performed by a User Equipment, UE, for transmitting Uplink, UL, signals for positioning purpose in a wireless communications network. The UE receives from a second network node, a UL signal switching configuration, and a UL signal configuration to transmit UL signals for positioning purpose on one or more carriers where the UE does not transmit user data. The UE further receives from the second network node a UL signal switching order. The UE then switches to at least one carrier where the UE does not transmit user data, to transmit the UL signals for positioning purpose. The UE then switches back to a carrier where the UE transmits user data.

According to a further aspect of embodiments herein, the object is achieved by a method performed by a second network node for handling Uplink, UL, signals to be transmitted by a User Equipment, UE, for positioning purpose in a wireless communications network. The second network node determines that the UE needs to transmit UL signals for positioning purpose. The second network node further determines for the UE, a UL signal switching configuration and a UL signal configuration to transmit UL signal for positioning purpose on one or more carriers where the UE does not transmit user data. The second network node sends to at least one out of the first network node or a third network node, information about the decided a UL signal switching configuration, and a UL signal configuration to transmit UL signal for positioning purpose on one or more carriers where the UE is not transmitting user data. The second network node sends to the UE, the decided a UL signal switching configuration, and UL signal configuration to transmit UL signal for positioning purpose on one or more carriers where the UE does not transmit user data. The second network node sends to the UE, a UL signal switching order to switch to at least one carrier where the UE does not transmit user data, to transmit UL signals for positioning purpose.

According to an aspect of embodiments herein, the object is achieved by a method performed by a third network node for measuring Uplink, UL, signals transmitted by a User Equipment, UE, for positioning purpose in a wireless communications network. The third network node obtains for the UE, a UL signal switching configuration, and a UL signal configuration to transmit UL signal for positioning purpose on one or more carriers where the UE does not transmit user data carriers. Based on the obtained UL signal switching configuration, and UL signal configuration to transmit UL signal for positioning purpose on one or more carriers where the UE does not transmit user data, the third network node receives UL signals from the UE, and performs a positioning measurement based on UL signals transmitted by the UE on a carrier where the UE does not transmit user data. The third network node then sends the result of the positioning measurement to a first network node.

According to a further aspect of embodiments herein, the object is achieved by a method performed by a first network node for determining a position of a User Equipment, UE, in a wireless communications network. The first network node determines that positioning will be performed for the UE. The first network node obtains for the UE, a Uplink, UL, signal switching configuration, and a UL signal configuration to transmit UL signal for positioning purpose on one or more carriers where the UE does not transmit user data. The first network node sends to one or more third network nodes, the obtained UL signal switching configuration, and UL signal configuration for the UE, to enable positioning measurements in the one or more third network nodes 113 based on UL signals transmitted by the UE on one or more carriers where the UE does not transmit user data. The first network node determines the location of the UE, based on received UL results of positioning measurements from the one or more third network nodes.

According to an aspect of embodiments herein, the object is achieved by a User Equipment, UE, for transmitting Uplink, UL, signals for positioning purpose in a wireless communications network. The UE is configured to:

Receive from a second network node a UL signal switching configuration, and a UL signal configuration to transmit UL signal for positioning purpose on one or more carriers where the UE does not transmit user data, receive from the second network node a UL signal switching order, switch to at least one carrier where the UE does not transmit user data, to transmit UL signals for positioning purpose, and switch back to a carrier where the UE transmits user data.

According to a further aspect of embodiments herein, the object is achieved by a second network node for handling Uplink, UL, signals to be transmitted by a User Equipment, UE, for positioning purpose in a wireless communications network. The second network node is configured to:

Determine that the UE needs to transmit UL signals for positioning purpose, determine for the UE a UL signal switching configuration, and a UL signal configuration to transmit UL signal for positioning purpose on one or more carriers where the UE does not transmit user data, send to at least one out of the first network node or a third network node 113 information about the decided a UL signal switching configuration, and a UL signal configuration to transmit UL signal for positioning purpose on one or more carriers where the UE is not transmitting user data, send to the UE the decided a UL signal switching configuration, and UL signal configuration to transmit UL signal for positioning purpose on one or more carriers where the UE does not transmit user data, and send to the UE a UL signal switching order to switch to at least one carrier where the UE does not transmit user data, to transmit UL signals for positioning purpose.

According to an aspect of embodiments herein, the object is achieved by a third network node for measuring Uplink, UL, signals transmitted by a User Equipment, UE, for positioning purpose in a wireless communications network. The third network node is configured to: Obtain for the UE a UL signal switching configuration, and a UL signal configuration to transmit UL signal for positioning purpose on one or more carriers where the UE does not transmit user data carriers, based on the obtained UL signal switching configuration, and UL signal configuration to transmit UL signal for positioning purpose on one or more carriers where the UE does not transmit user data, receive UL signals from the UE, and perform a positioning measurement based on UL signals transmitted by the UE on a carrier where the UE does not transmit user data, and send the result of the positioning measurement to a first network node.

According to a further aspect of embodiments herein, the object is achieved by a first network node for determining a position of a User Equipment, UE, in a wireless communications network. The first network node is configured to:

Determine that positioning will be performed for the UE, obtain for the UE a Uplink, UL, signal switching configuration, and a UL signal configuration to transmit UL signal for positioning purpose on one or more carriers where the UE does not transmit user data, send to one or more third network nodes, the obtained UL signal switching configuration, and UL signal configuration for the UE, to enable positioning measurements in the one or more third network nodes based on UL signals transmitted by the UE on one or more carriers where the UE does not transmit user data, and determine the location of the UE, based on received UL results of positioning measurements from the one or more third network node(s).

BRIEF DESCRIPTION OF THE DRAWINGS

FIGS. 13-16 are flowcharts illustrating methods implemented in a communication system including a host computer, a base station and a user equipment.

DETAILED DESCRIPTION

As a part of developing embodiments herein the inventors identified a problem which first will be discussed.

SRS switching has been standardized in LTE and recently in NR for Radio Resource Management (RRM) purpose, but its benefits are not yet possible to exploit for positioning. The potential benefits are particularly important in NR, where a BS bandwidth is large and may be up to 100 MHz for Frequency Range 1 (FR1), below 6 GHz, and up to 400 MHz for Frequency Range 2 (FR2), above 6 GHz, while the UE bandwidth capability will be typically much smaller. Therefore the BS bandwidth is likely to be split into multiple subbands and configured as CCs for the UEs depending on the UE capability. The maximum number of configurable CCs is different for different UEs. With SRS carrier based switching, even for UEs with a limited bandwidth and CC capability, it will be possible to perform UL positioning measurements over a larger bandwidth and more CCs. For example, without SRS switching, a UE may be capable to transmit only over one or maybe two CCs, while with SRS switching the number of CCs with SRS transmissions from such UE may be significantly larger. The UL positioning will thus become more accurate and the spectrum will be exploited more efficiently.

Figure 1:
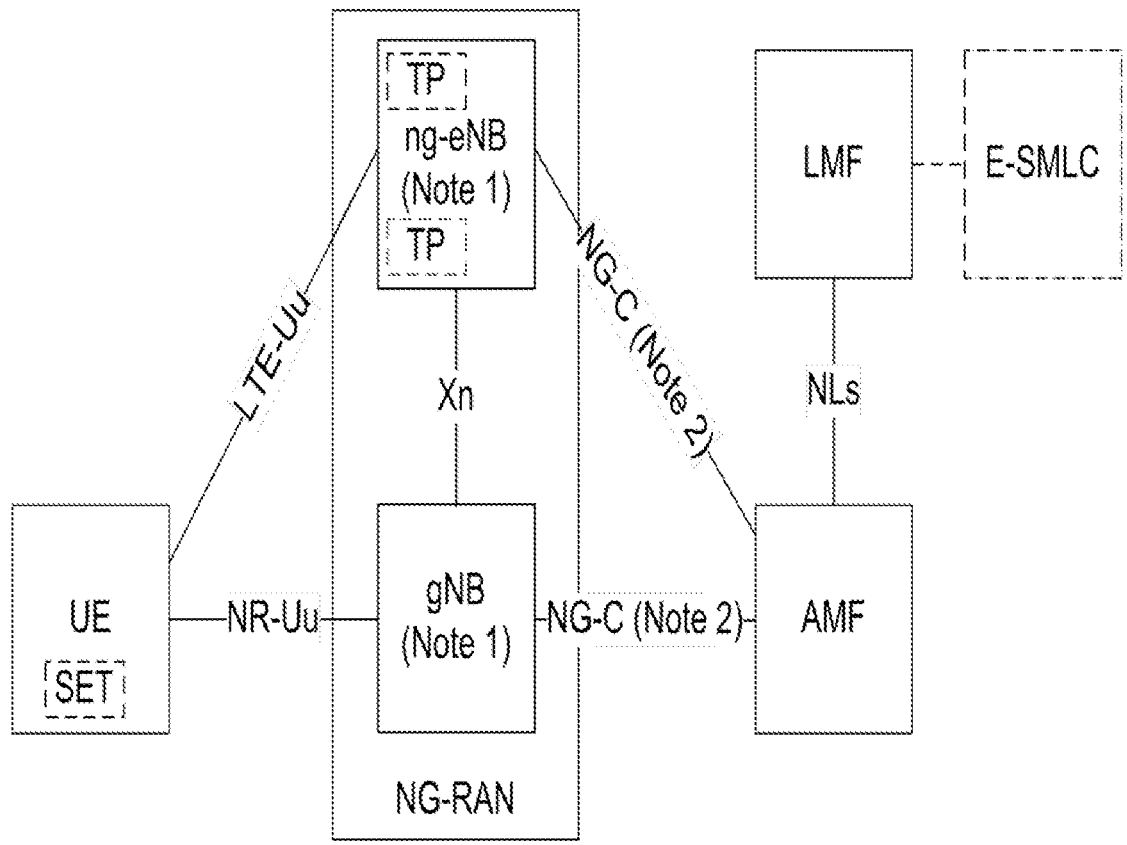
FIG. 1 is a schematic block diagram illustrating an NR architecture according to prior art.
Figure 2:
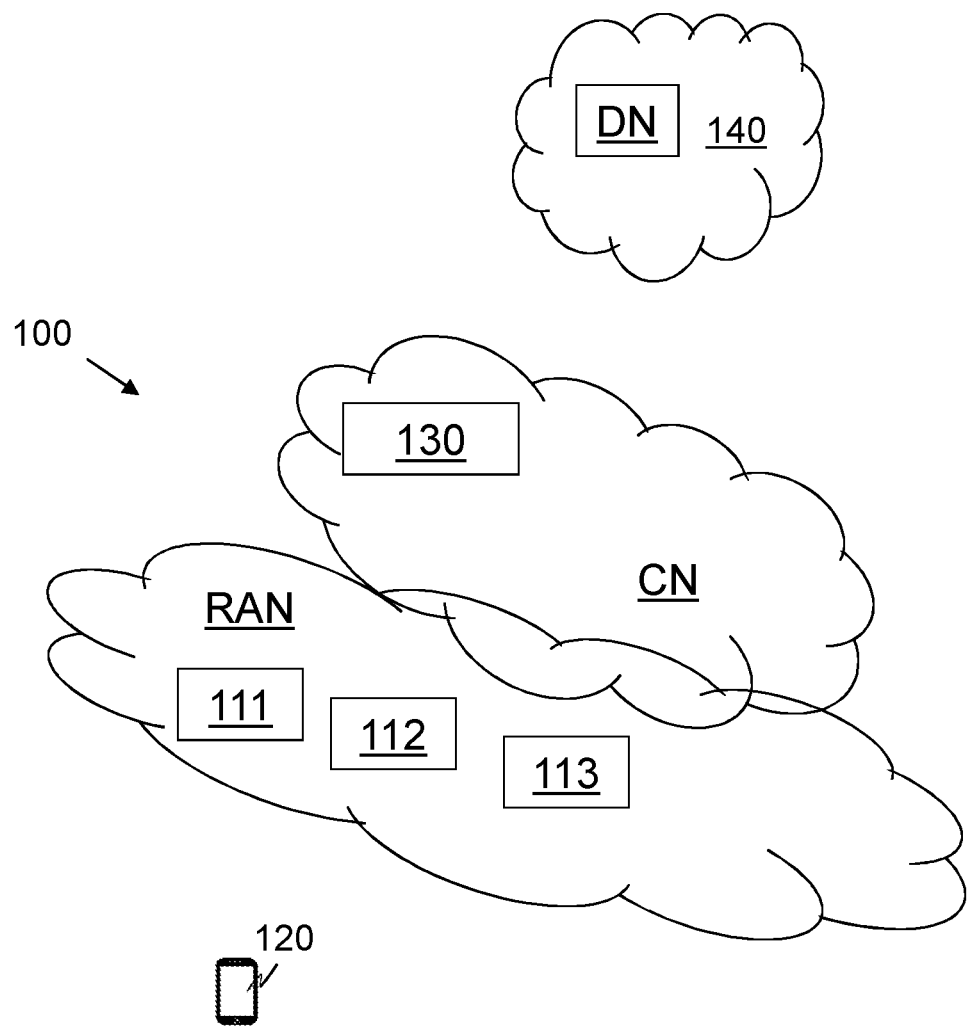
FIG. 2 is a schematic block diagram illustrating embodiments of a wireless communications network.

Embodiments herein relate to wireless communication networks in general. FIG. 2 is a schematic overview depicting a wireless communications network 100 wherein embodiments herein may be implemented. The wireless communications network 100 comprises one or more RANs and one or more CNs. The wireless communications network 100 may use a number of different technologies, such as W-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Network nodes operate in the wireless communications network 100 such as a first network node 111, a second network node 112 and a third network node 113. The first network node 111 provides radio coverage over a geographical area, a service area referred to as a cell, which may also be referred to as a beam or a beam group of a first radio access technology (RAT), such as 5G, LTE, W-Fi or similar. The second and third network nodes 112, 113 also provides radio coverage over a geographical area, a service area referred to as a cell, which may also be referred to as a beam or a beam group of a first radio access technology (RAT), such as 5G, LTE, W-Fi or similar. The first, second and third network nodes 111, 112, 113 may each be a NR-RAN node, transmission and reception point e.g. a base station, a radio access access node such as a Wireless Local Area Network (WLAN) access point or an Access Point Station (AP STA), an access controller, a base station, e.g. a radio base station such as a NodeB, an evolved Node B (eNB, eNode B), agNB, a base transceiver station, a radio remote unit, an Access Point Base Station, a base station router, a transmission arrangement of a radio base station, a stand-alone access point or any other network unit capable of communicating with a wireless device within the service area served by the respective network node 111, 112, 113 depending e.g. on the first radio access technology and terminology used. According to some embodiments herein, the first network node 111 may be a Location server, the second network node 112 may be a serving and/or configuring base station and the third network node 113 may be a measuring radio network node, such as a serving or neighbor base station or Location Measurement Unit (LMU). The respective network node 111, 112, 113 may be referred to as radio nodes and may communicate with a UE 120 with Downlink (DL) transmissions to the UE 120 and Uplink (UL) transmissions from the UE 120.

The second node may e.g., in some embodiments be a serving node for the UE 120, and in some other embodiments be a positioning node.

A number of UEs operate in the wireless communication network 100, such as the UE 120. The UE 120 may be a mobile station, a non-access point (non-AP) STA, a STA, a user equipment and/or a wireless terminals, that communicate via one or more Access Networks (AN), e.g. RAN, e.g. via the network nodes 111, 112, 113 to one or more core networks (CN) e.g. comprising a CN node 130. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Figure 6:
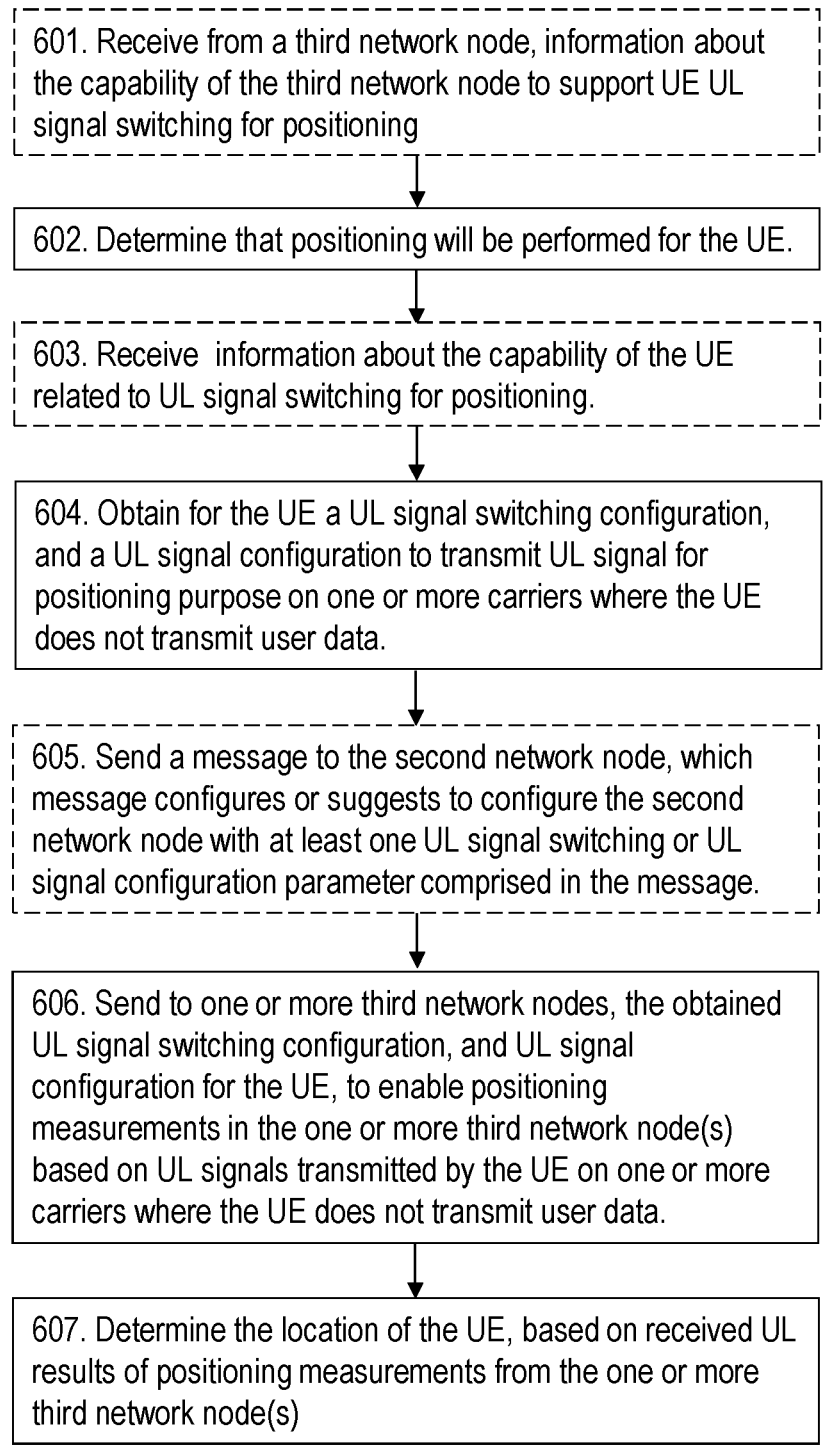
FIG. 6 is a flowchart depicting a method performed by a first network node according to embodiments herein.

Methods herein may in a first aspect be performed by the UE 120, and in a second, third and fourth aspect by the network nodes such as the network nodes 111, 112, 113. As an alternative, a Distributed Node (DN) and functionality, e.g. comprised in a cloud 140 as shown in FIG. 6, may be used for performing or partly performing the methods.

Methods according to embodiments herein are provided in the UE 120, the first network node 111 which may be a Location Server, the second network node 112 which may be the serving and/or configuring Base Station (BS) and/or a positioning node, and the third network node 113 which may be a measuring radio network node such as a serving or neighbor BS or LMU. In the examples below, the order of steps may be different in some variations of the examples.

Figure 3:
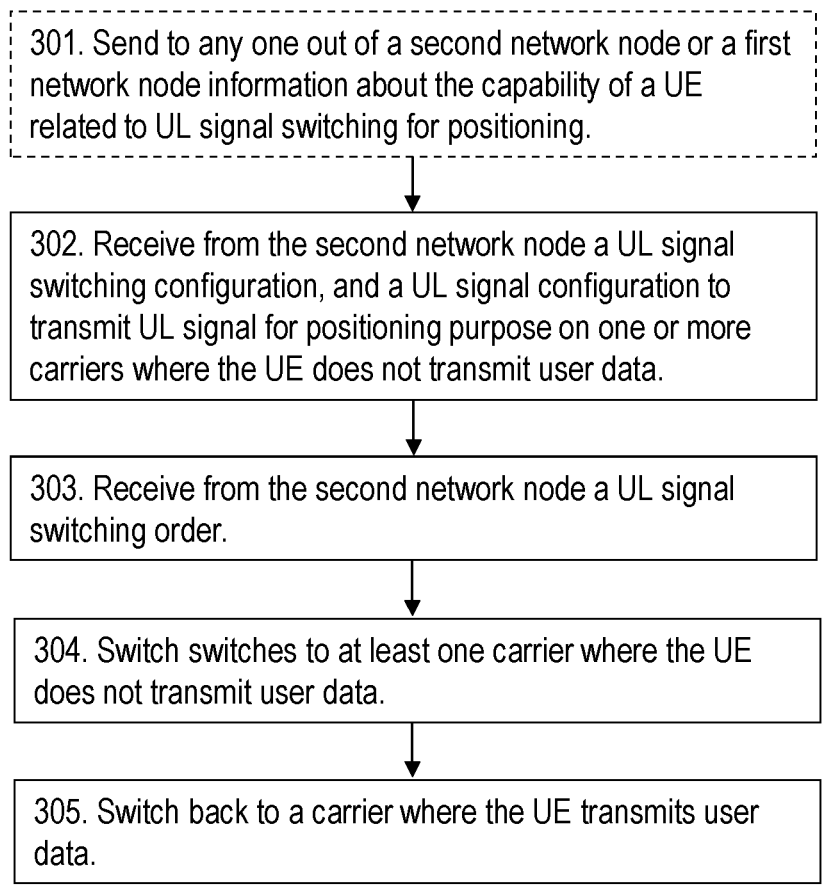
FIG. 3 is a flowchart depicting a method performed by a UE according to embodiments herein.

FIG. 3 shows an example method performed by the UE 120 for transmitting UL signals, for positioning purpose in a wireless communications network 100. The UE 120 may in some embodiments be served by the second network node 112.

The method comprises one or more of the following actions, which actions may be taken in any suitable order. Actions that are optional are marked with dashed boxes in the figure Action 301

In some embodiments, the UE 120 sends information to any one out of the second network node 112 or a first network node 111. The information is about the capability of the UE 120 related to UL signal switching for positioning such as e.g. UL positioning or UTDOA.

Action 302

The UE 120 receives configurations from the second network node 112. The configurations comprises a UL signal switching configuration, and a UL signal configuration to transmit UL signal for positioning purpose on one or more carriers where the UE 120 does not transmit user data, such as e.g. PUSCH.

Action 303

The UE 120 receives a UL signal switching order from the second network node 112, e.g. via an aperiodic trigger in DCI, or derived from a periodic configuration.

Action 304

The UE 120 switches to at least one carrier where the UE 120 does not transmit user data e.g. PUSCH. The switching is to transmit UL signals for positioning purpose. The UL signals may e.g. be represented by SRS, RACH, DMRS or PT-RS, wherein the positioning may be represented by UL positioning or UTDOA.

Action 305

The UE 120 then switches back to a carrier where the UE 120 transmits user data e.g., PUSCH.

Figure 4:
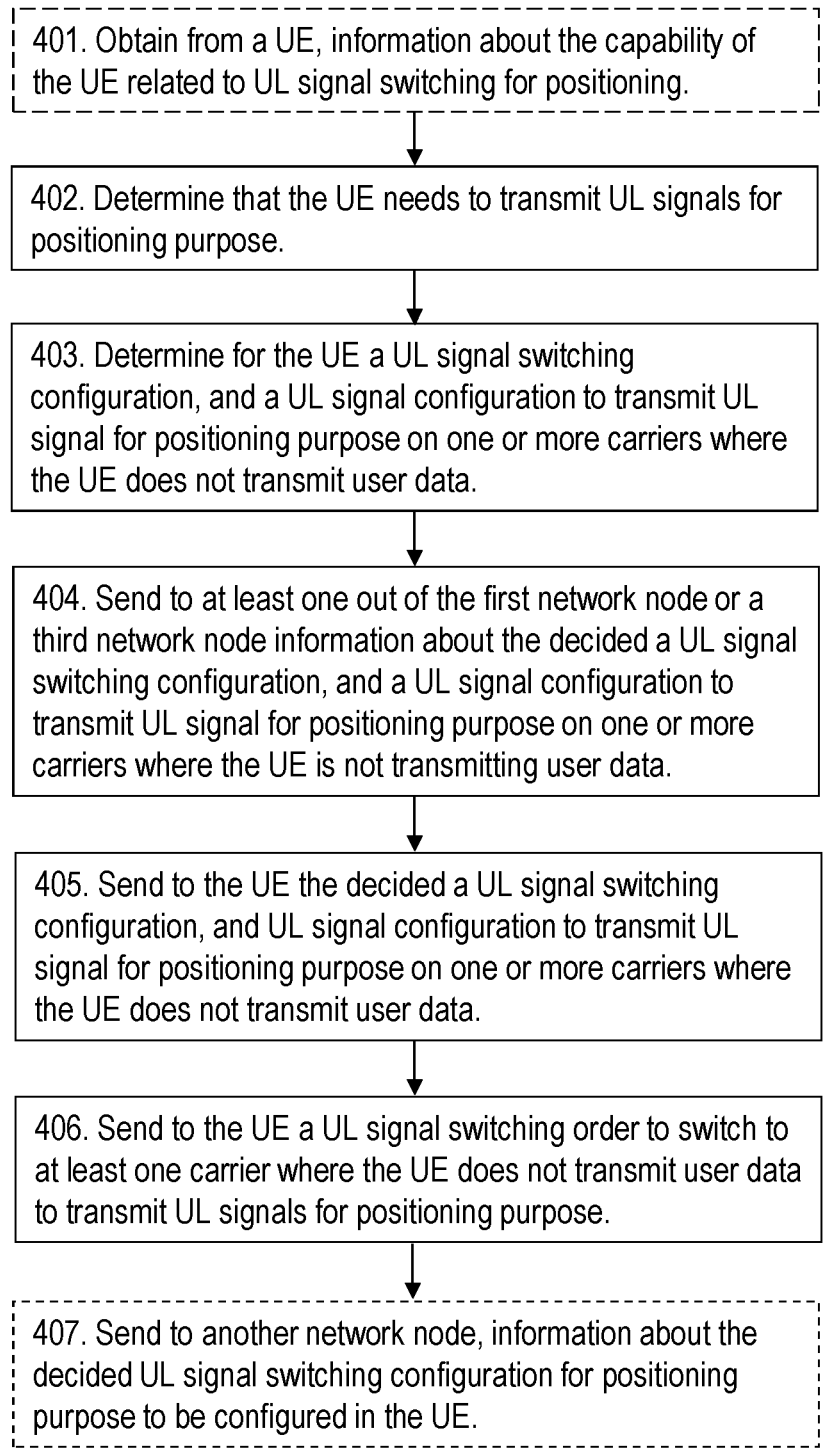
FIG. 4 is a flowchart depicting a method performed by a second network node according to embodiments herein.

FIG. 4 shows an example method performed by the second network node 112 for handling UL signals to be transmitted by the UE 120 for positioning purpose in a wireless communications network 100.

The method comprises one or more of the following actions, which actions may be taken in any suitable order. Actions that are optional are marked with dashed boxes in the figure.

As mentioned above, the second node may for example be a serving node for the UE 120, or a positioning node. When the second node is the serving node, its actions may be in response to a message from a positioning node related to the need to configure the UE with the necessary UL signals for positioning.

Action 401

In some embodiments, the second network node 112 obtains information from the UE 120. The information is about the capability of the UE 120 related to UL signal switching for positioning, e.g. UL positioning. The information may e.g. comprise capabilities in switching retuning time, UL CA capability, bandwidth capability, etc., which information may be used by the second network node 112 to, e.g. derive the need and configuration for the UL signal transmissions and UL signal switching.

Action 402

The second network node 112 determines that the UE 120 needs to transmit UL signals for positioning purpose. This may e.g. be based on a message from the first network node 111 such as a Location Server.

Action 403

The second network node 112 determines configurations for the UE 120. The configurations comprises a UL signal switching configuration, and a UL signal configuration to transmit UL signal for positioning purpose on one or more carriers where the UE 120 does not transmit user data. Such carries may e.g. be PUSCH carriers.

The determining of the configurations may e.g., based on at least:
- one or more pre-defined parameters for UL signal switching and UL signal configuration for positioning,
- the UL signal switching capability of the UE 120, the UE 120 Bandwidth (BW) and/or CC/CA related capability information
- capability of at least one third network node 113 such as its ability to receive UL signals from the UE 120 on a certain CC,
- UL positioning measurement requirements,
- a message from first network node 111 or
- message from another network node such as O&M or SON suggesting/configuring at least one parameter value for UL signal switching or UL signal for positioning, etc.

Action 404

The second network node 112 sends information to at least one out of the first network node 111 or a third network node 113. The information is about the decided a UL signal switching configuration, and a UL signal configuration to transmit UL signal for positioning purpose on one or more carriers e.g. PUSCH, where the UE is not transmitting user data. The information may further comprise at least one UL signal switching related parameter.

Action 405

The second network node 112 sends configurations to the UE 120. The configurations comprises the decided UL signal switching configuration, and UL signal configuration to transmit UL signal for positioning purpose on one or more carriers where the UE 120 does not transmit user data, e.g. PUSCH Action 406

The second network node 112 sends a UL signal switching order to the UE 120. The UL signal switching order orders to switch to at least one carrier where the UE 120 does not transmit user data e.g., PUSCH, to transmit UL signals for positioning purpose. The order may e.g. be sent e.g. via an aperiodic trigger in DCI, or a configured order for periodic transmission.

The UL signals e.g. may be represented by SRS, RACH, DMRS or PT-RS, wherein the positioning may be represented by UL positioning or UTDOA.

Action 407

In some embodiments, the second network node 112 sends information about the decided a UL signal switching configuration for positioning purpose to be configured in the UE 120, to another network node, such as e.g. a neighbor BS or O&M, SON, etc.

Figure 5:
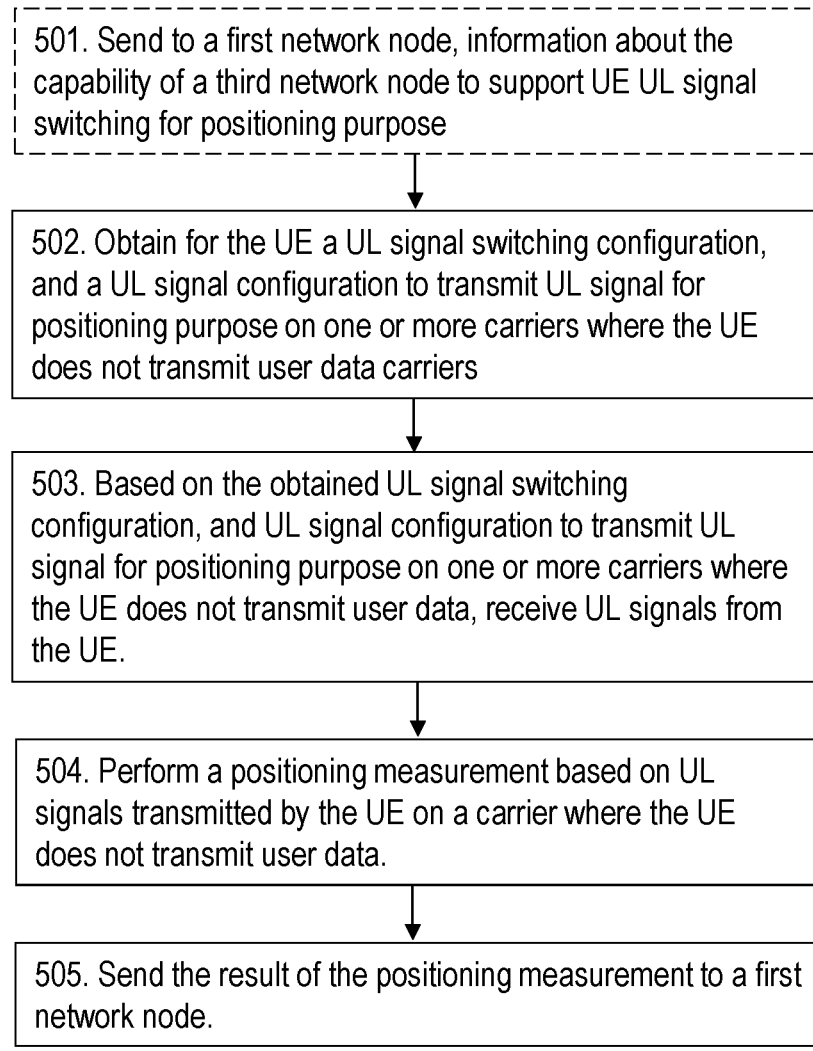
FIG. 5 is a flowchart depicting a method performed by a third network node according to embodiments herein.

FIG. 5 shows an example method performed by the third network node 113 for measuring UL signals transmitted by the UE 120 for positioning purpose in a wireless communications network 100.

The method comprises one or more of the following actions, which actions may be taken in any suitable order. Actions that are optional are marked with dashed boxes in the figure.

Action 501

In some embodiments, the second network node 112 sends information to the first network node 111. The information is about the capability of the third network node 113 to support UE UL signal switching for positioning purpose, e.g. in unsolicited way or upon a request from the first network node.

Action 502

The second network node 112 obtains configurations for the UE 120. The configurations comprises a UL signal switching configuration, and a UL signal configuration to transmit UL signal for positioning purpose on one or more carriers where the UE does not transmit user data. Such carries may e.g. be PUSCH carriers. The configurations are e.g. based on a message from the first network node 111 and/or second network node 112. The message may e.g. be over F1AP or SLmAP interface.

Action 503

Based on the obtained UL signal switching configuration, and UL signal configuration to transmit UL signal for positioning purpose on one or more carriers where the UE does not transmit user data, such as e.g. PUSCH, the second network node 112 receives UL signals from the UE 120.

Action 504

The second network node 112 performs a positioning measurement based on UL signals transmitted by the UE 120 on a carrier where the UE (120) does not transmit user data.

The UL signals may e.g. be represented by SRS, RACH, DMRS or PT-RS, wherein the positioning may be represented by UL positioning or UTDOA.

Action 505

The second network node 112 then sends the result of the positioning measurement to the first network node 111. This may be sent, e.g. directly or indirectly via another network node. In some embodiments it may be sent to the second network node 112 or another network node associated with the third network node 113, such as a node controlling an LMU or a BS co-located with LMU, which will further send it to the first network node 111.

FIG. 6 shows an example method performed by first network node 111 for determining a position of the UE 120 in the wireless communications network 100.

The method comprises one or more of the following actions, which actions may be taken in any suitable order. Actions that are optional are marked with dashed boxes in the figure.

Action 601

In some embodiments, the first network node 111 receives information from the third network node 111. The information is about the capability of the third network node 113 to support UE UL signal switching for positioning, e.g. in unsolicited way or upon a request from the first network node.

Action 602

The first network node 111 determines that positioning will be performed for the UE 120.

Action 603

In some embodiments, the first network node 111 receives information about the capability of the UE 120 related to UL signal switching for positioning. This may e.g. comprise capabilities in switching retuning time, UL CA capability, bandwidth capability, etc. This may be used by the first network node 111 to e.g. derive the need and configuration for the positioning assistance data to be transmitted to the measuring nodes based on UL signal switching.

Action 604

The first network node 111 obtains configurations for the UE 120. The configurations comprises a UL signal switching configuration, and a UL signal configuration to transmit UL signal for positioning purpose on one or more carriers where the UE does not transmit user data. Such carriers may e.g. be PUSCH carriers. The first network node 111 obtains configurations for the UE 120, e.g., from the second network node 112 and/or determining one or more parameters for SRS switching and SRS configuration by itself or based on a message from another node such as O&M or SON.

Action 605

In some embodiments, the first network node 111 sends a message to the second network node 112. The message configures or suggests to configure the second network node 112 with at least one UL signal switching or UL signal configuration parameter comprised in the message.

Action 606

The first network node 111 sends the configurations to one or more third network nodes 113. The configurations comprises the obtained UL signal switching configuration, and UL signal configuration for the UE 120. This is to enable positioning measurements in the one or more third network nodes 113 based on UL signals transmitted by the UE 120 on one or more carriers where the UE does not transmit user data e.g., PUSCH.

Action 607

The first network node 111 determines the location of the UE 120, based on received UL results of positioning measurements from the one or more third network nodes 113. The UL signals e.g. may be represented by SRS, RACH, DMRS or PT-RS, wherein the positioning may be represented by UL positioning or UTDOA.

This may e.g. further be based on a UTDOA positioning method or a multi-lateration technique.

The embodiments above will now be further explained and exemplified. In below example the PUSCH is used as an example, but it should be noted that theses wordings such as "PUSCH-less carriers" and "carrier without PUSCH" can be used interchangeably with the meaning of a carrier where the UE (120) does not transmit user data.

The example embodiments below are described for SRS UL signal but they are also applicable for other types of UL reference signals, e.g., phase tracking reference signal (PT-RS), UL DMRS, etc., or channels, e.g., RACH, which may be used for UL positioning.

Example embodiments of the method performed by the UE 120 e.g. served by the second node may comprise the following actions:

In some but not all examples, the UE 120 provides in unsolicited way or upon a network node's request, UE 120 capability related to SRS switching for UL positioning to at least one of: the second node and first node. This is to inform the nodes about the UEs capability related to SRS switching for UL positioning. This may comprise capabilities in switching retuning time, UL CA capability, bandwidth capability, etc. and may be used by the second network node 112 to, e.g. derive the need and configuration for the SRS transmissions and SRS switching. This action relates to action 301 described above.

The UE 120 receives from the second network node 112, an SRS switching configuration and an SRS configuration to transmit SRS for positioning purpose on one or more PUSCH-less carriers. The SRS configuration and SRS switching configuration may also be adapted to meet positioning needs and requirements. This means that UL SRS configuration may be power controlled by the second network node 112 to minimize interference. This action relates to action 302 described above.

The UE 120 receives from the second network node 112, a UL switching order such as an SRS switching order. This may e.g. be received either via an aperiodic trigger in DCI, see examples of DCI request below, or be derived from a periodic configuration. An aperiodic trigger in DCI when used herein means a trigger from physical layer which would contain configuration details for UL Switching for one occasion. The periodic configuration when used herein is e.g. RRC based, and may be used if the UE 120 needs to perform the UL SRS switching periodically. This action relates to action 303 described above.

The UE 120 switches to at least one carrier without PUSCH, to transmit SRS for positioning purpose. This is according to the SRS configuration to transmit SRS for positioning purpose on one or more PUSCH-less carriers and the received SRS switching order. In this way, an SRS transmission will be configured in a robust mechanism for positioning. This action relates to action 304 described above.

The UE 120 switches back to a carrier with PUSCH. This is performed after the transmitting of the SRS for positioning purpose. In this way the SRS transmission will be configured in a robust mechanism for positioning. The minimum duration of UL SRS transmission in a certain carrier depends upon duration of one occasion of UL SRS Resource. The second network node 112 may configure multiple UL resource for SRS transmission; thus the duration may vary. This action relates to action 305 described above.

The switch back should be fast; may be just one symbol duration.

Example embodiments of the method performed by the second network node 112, such as e.g. a BS serving the UE 120, may comprise the following actions:

The second network node 112 determines that the UE 120 needs to transmit SRS for positioning purpose. The determining may e.g. be based on a message from a Location Server. This action relates to action 402 described above.

In some but not all examples, the second network node 112 obtains SRS switching capability from the UE 120. This may comprise capabilities in switching retuning time, UL CA capability, bandwidth capability, etc. and may be used by the second network node 112 to, e.g. derive the need and configuration for the SRS transmissions and SRS switching. This action relates to action 401 described above.

The second network node 112 determines SRS switching configuration and SRS configuration for the UE 120 UL positioning. This may e.g. be based on at least: one or more pre-defined parameters for SRS switching and SRS configuration for positioning, the SRS switching capability, the UE 120 BW and/or CC/CA related capability information, capability of at least one third network node 113 such as its ability to receive UE 120's SRS on a certain CC, UL positioning measurement requirements, message from first network node 111 or message from another network node such as O&M or SON suggesting/configuring at least one parameter value for SRS switching or SRS for positioning, etc. This action relates to action 402 described above.

The second network node 112 then informs at least one of: the first network node 111 and third network node 113, about the SRS switching configured or to be configured in the UE 120 for positioning purpose. The informing may also comprise at least one SRS switching related parameter. This is to ensure that UL SRS is transmitted by the UE 120 from a cell in the first network node 111 to a reception point in the second network node 112. This action relates to action 404 described above.

The second network node 112 configures the UE 120 with SRS switching to transmit SRS for positioning purpose on at least one carrier without PUSCH. This is performed by sending the configuration to the UE 120. This action relates to action 405 described above.

In some but not examples, the second network node 112 sends the UE 120 SRS switching configuration for UL positioning to another network node, such e.g. a neighbor BS or O&M, SON, etc. This action relates to action 407 described above.

The second network node 112 then sends SRS switching orders to the UE 120. The SRS switching orders may e.g. be in the form of aperiodic triggering, e.g. via DCI, or a configured order for periodic transmission. This action relates to action 406 described above.

Example embodiments of the method performed by the third network node 113, e.g. the measuring radio network node, may comprise the following actions:

In some but not all examples, the third network node 113 receives from the first network node 111 information about its capability related to support UE 120 SRS switching for positioning. This may be performed in an unsolicited way or upon a request from the third network node 113. This action relates to action 501 described above.

The third network node 113 obtains e.g. by determining SRS switching configuration and SRS configuration for the UE 120 UL positioning. This may e.g. be based on a message from the first network node 111 and/or second network node 112. This action relates to action 502 described above.

Based on the determined SRS switching configuration and SRS configuration, the third network node 113 receives SRS and performs a positioning measurement based on SRS transmitted by the UE 120 on a carrier where the UE 120 does not transmit PUSCH. The positioning measurement Relative Time of Arrival (RTOA) may be performed by LMU. This action relates to actions 503 and 504 described above The third network node 113 then sends the measurement result to the first network node 111 directly or indirectly via another network node. The measurement result may e.g. be sent to the serving BS or another network node associated with the third network node 113 such as a node controlling an LMU or a BS co-located with LMU, which will further send it to the first network node 111. This action relates to action 506 described above.

Example embodiments of the method performed by the first network node 111 may comprise any of the following actions:

In some but not all examples, the first network node 111 receives from the third network node 113, information about its capability related to supporting UE SRS switching for positioning. This may be received in an unsolicited way or upon a request from the first network node 111. This action relates to action 601 described above.

The first network node 111 determines that UL positioning will be performed for a UE 120. This may be determined by the request for positioning message received from the third network node 113, such as e.g. an E-SMLC or an LMF Node. This action relates to action 602 described above.

In some but not all examples, the first network node 111 obtains SRS switching capability from the UE 120. This may comprise capabilities in switching retuning time, UL CA capability, bandwidth capability, etc. This may be used by the first network node 111 to e.g. derive the need and configuration for the positioning assistance data (to be transmitted to the measuring nodes) based on SRS switching. This action relates to action 603 described above.

The first network node 111 obtains an SRS switching configuration and an SRS configuration for the UE 120. This may e.g. be obtained from the second network node 112 and/or by determining one or more parameters for SRS switching and SRS configuration by itself or based on a message from another node such as O&M or SON. This action relates to action 604 described above.

In some but not all examples, the first network node 111 suggests or configures at least one SRS switching or SRS configuration parameter by sending a message to the second network node 112. This action relates to action 605 described above.

The first network node 111 sends the SRS switching and the SRS configuration for the UE 120 to one or more of the third network nodes 113. This is to enable positioning measurements in the third network node(s) 113 based on SRS transmitted by the UE 120 on at least one carrier without PUSCH. This action relates to action 606 described above.

The first network node 111 receives one or more measurement results from one or more of the third network nodes 113. This action relates to action 607 described above.

The first network node 111 then uses the received measurement results for determining the UE 120 location. This may e.g. be performed based on an UTDOA positioning method or a multi-lateration technique. This action relates to action 607 described above.

Some advantages of embodiments provided herein may comprise at least more immune to multipath fading and more reliable results which can improve the positioning accuracy based on UL measurements.

The methods will now be described and exemplified in more detail in the below text.

In some embodiments the UE 120 is configured with SRS switching to transmit SRS on at least one cell or carrier or frequency or in UL bandwidth part where the UE 120 is not configured with PUSCH. This is to enable parallel UL measurements for the UE 120 positioning over multiple parts of the bandwidth, wherein the number of parts of the bandwidth is potentially larger than without SRS switching. The radio network nodes performing measurements may also need to be aware of SRS switching configuration to properly perform the UL measurements. The signaling necessary to support UL positioning with SRS switching is also described herein. The UL measurements obtained at the same measuring node or location for the same UE 120 performing switching between the different part/carriers may also be processed in a special way.

UL Signals and UL Signal Switching

Embodiments herein are described for SRS but they are also applicable for other types of UL signals such as UL reference signals (e.g., PT-RS, UL DMRS, etc.) or channels (e.g., RACH) which can be used for UL positioning.

In one example, the embodiments described herein apply for a single-port UL signal, e.g., single-port SRS.

In another example, the embodiments described herein apply for a multi-port UL signal, e.g., multi-port SRS.

SRS Switching Configuration and SRS Configuration

As clarified above, the term "SRS" in the embodiments herein may be understood more broadly as UL signal, e.g., reference signal or channel, transmitted by the UE 120 for positioning purpose. Hence, the terms "SRS configuration" and "SRS switching configuration" may also be understood more broadly as "UL signal configuration" and "UL signal switching configuration", respectively.

The UL signal configuration may comprise one or more of:

Information about the UE 120 antenna port(s) used to transmit the UL signal, e.g., number of ports, port index, etc.

Implicit or explicit information about the direction of the UL signal transmission and UE 120 beamforming configuration, e.g., direction of the serving BS, direction in which the best beam on the carrier is received, beam width, beam index, etc.

Channel properties, e.g., quasi co-location with a specific channel/signal or its transmission point.

UL signal transmit power or power control configuration parameter(s)

Carrier frequency

Bandwidth

Time-frequency resource allocation/scheduling, (including, but not limited to, comb factor, comb offset, and number of symbol in time domain), frequency domain position, frequency hopping configuration and/or group hopping configuration (the difference is that the UE 120 may hop within the UE 120 RF bandwidth on the same carrier but the switching is between different carriers or bandwidth parts which may be beyond the UE 120 RF bandwidth), Periodicity for periodic UL signal UL signal type (e.g., SRS, TP-RS, DMRS, RACH, etc.)

UL signal numerology (e.g., subcarrier spacing)

UL configuration index which determine a set of pre-defined parameters

UL signal transmission trigger type or trigger configuration

UL signal switching configuration may comprise one or more of:

Cell or carrier or frequency or UL bandwidth part from which the switching is performed One or more cells or carriers or bandwidth parts to which the switching is performed Time, periodicity or time resources when the switching is to be performed Number of switching occurrences or the total time during which the UE 120 will be performing switching and transmitting UL signal for positioning or a condition/indication when the stops performing switching and corresponding UL signal transmissions Number of UL signal transmissions while the UE 120 remain on the cell/carrier/frequency/UL bandwidth part before next switching or switching back The time from which and during which the UE 120 remain on the cell/carrier/frequency/UL bandwidth part before next switching or switching back Interruption length which may be caused by a single switching (may depend on the frequency range such as FR1 or FR2, UL signal numerology such as subcarrier spacing, UE 120 capability, number of carriers over which the switching is performed, subframe type or subframe configuration in which the switching or corresponding UL signal transmission is performed, UE 120 architecture, etc.)

Implicit or explicit indication of whether the switching is within a frequency range (e.g., FR1 only or FR2 only) or across multiple frequency ranges (e.g., between FR1 and FR2)

An indication of a time after which the UE 120 will stop SRS switching and corresponding SRS transmissions for positioning.

Methods in the UE 120

Example embodiments in the UE 120 served by the second node comprise:

(In some but not all examples) providing (in unsolicited way or upon a network node's request) UE 120 capability related to SRS switching for UL positioning to at least one of: the second node and first node.

Receiving from a second network node 112, SRS switching configuration and SRS configuration to transmit SRS for positioning purpose on one or more PUSCH-less carriers (the SRS configuration and SRS switching configuration may be also be adapted to meet positioning needs and requirements).

Receiving from a second network node 112, an SRS switching order, either via an aperiodic trigger in DCI (see examples of DCI request below), or derived from a periodic configuration.

Switching to at least one carrier without PUSCH to transmit SRS for positioning purpose.

Switching back to a carrier with PUSCH.

The UE 120 may stop SRS switching and corresponding SRS transmissions for positioning after a pre-defined time known to the measuring nodes, after a time configured by the second network node 112, which was communicated also to the measuring nodes directly or via the first network node 111, or upon receiving a request to stop from the second network node 112.

Examples of DCI Request for Aperiodic SRS:

| Value of SRS request field | Triggered aperiodic SRS resource set(s) |
|---|---|
| 00 | No aperiodic SRS resource set triggered |
| 01 | SRS resource set(s) configured with higher layer parameter aperiodicSRS-ResourceTrigger set to 1 |
| 10 | SRS resource set(s) configured with higher layer parameter aperiodicSRS-ResourceTrigger set to 2 |
| 11 | SRS resource set(s) configured with higher layer parameter aperiodicSRS-ResourceTrigger set to 3 |

Methods in the Second Network Node 112 (e.g., Serving BS)

Example embodiments in the BS (second network node 112) serving the UE 120 comprise:

Determining that the UE 120 needs to transmit SRS for positioning purpose (e.g., based on a message from a Location Server).

(In some but not all examples) Obtaining SRS switching capability from the UE 120. This can comprise capabilities in switching retuning time, UL CA capability, bandwidth capability, etc. can be used by the second network node 112 to, e.g. derive the need and configuration for the SRS transmissions and SRS switching.

Determining SRS switching configuration and SRS configuration for the UE 120 UL positioning (e.g., based on at least: one or more pre-defined parameters for SRS switching and SRS configuration for positioning, the SRS switching capability, the UE 120 BW and/or CC/CA related capability information, capability of at least one third network node 113 such as its ability to receive UE 120's SRS on a certain CC, UL positioning measurement requirements, message from first network node 111 or message from another network node such as O&M or SON suggesting/configuring at least one parameter value for SRS switching or SRS for positioning, etc.).

Informing at least one of: the first network node 111 and third network node 113, about the SRS switching configured or to be configured in the UE 120 for positioning purpose, where the informing may also comprise at least one SRS switching related parameter.

Configuring the UE 120 with SRS switching to transmit SRS for positioning purpose on at least one carrier without PUSCH.

(In some but not examples) Sending the UE 120 SRS switching configuration for UL positioning to another network node (neighbor BS or O&M, SON, etc.)

Sending to the UE 120 SRS switching orders in the form of aperiodic triggering (e.g. via DCI) or a configured order for periodic transmission.

In addition to the above, the second network node 112 may also determine when SRS switching is no longer needed for UL positioning and control the UE 120 to stop performing SRS switching and corresponding transmissions. The determining may also comprise determining of that the UE 120 has been transmitting during a time sufficient for the measuring network node to complete the UL measurement at a required accuracy level according to UL measurement requirements, perhaps with some margin added to account for protocol delays; or when the first network node 111 has informed the second network node 112 that the UL measurements are complete (e.g., the first network node 111 has received all configured measurements from the measuring nodes) and the UE 120 may stop SRS switching and corresponding SRS transmissions, etc.

In some examples, the second network node 112 may also inform the measuring nodes directly or via the first network node 111 that the UE 120 transmissions are going to be stopped (e.g., when the first network node 111 has not indicated that the UL measurements are complete) or have been stopped (e.g., when the first network node 111 indicated that the UL transmissions are not needed).

Methods in a Third Network Node 113 (Measuring Radio Network Node)

Herein, the measuring radio network node may be the node receiving the UL signals from the UE 120 at the physical layer (which may be even just a layer-one node or a remote antenna in a distributed antenna system or RRH etc) or the node which process the samples to obtain the measurement (e.g., such node may be even controlling multiple layer-one nodes).

Example embodiments in the measuring radio network node (third network node 113):

(In some but not all examples) Sending Receiving (in unsolicited way or upon a request from the first network node 111) to the fist network node its capability related to support UE 120 SRS switching for positioning.

Determining SRS switching configuration and SRS configuration for the UE 120 UL positioning (e.g., based on a message from the first network node 111 and/or second network node 112).

Based on the determined SRS switching configuration and SRS configuration, receiving SRS and performing a positioning measurement based on SRS transmitted by the UE 120 on a carrier where the UE 120 does not transmit PUSCH.

Sending the measurement result to a first network node 111 directly or indirectly via another network node (e.g., send to the serving BS or another network node associated with the third network node 113 such as a node controlling an LMU or a BS co-located with LMU, which will further send it to the first network node 111).

In addition to the above steps, the third network node 113 (Location Server or measuring node) may obtain UL measurement results from various bandwidth parts and determines a quality characteristic (e.g., the accuracy level or uncertainty) for the result associated with the part of the bandwidth or a quality characteristic for the part of the bandwidth itself where the measurement was performed, e.g., based on other measurements and/or reports from other UEs such as CQI reports. Based on this characteristic, the network node may process the measurements accordingly, e.g., prioritize or select good (e.g., quality is above a threshold) measurements and deprioritize or drop poor-quality measurements, prior to using them for positioning. A network node may also apply a function to the measurements over multiple parts of the bandwidth performed at the same mearing node/location for the same UE 120, e.g., a function may be average( ), median( ) or a certain percentile such as 90th or 95th percentile, weighted average( ), min( ), max( ), etc. In another example, during the processing or during UE 120 position calculation, poor-quality measurements may be assigned a lower weight while better-quality measurements may be assigned a higher weight.

In addition to the above, the measuring network node follows the UE 120 SRS switching at least during the time it needs to perform UL measurements at a required accuracy level or until it is notified by the first or the second node that the UE 120 SRS switching with corresponding SRS transmissions are going to be stopped.

Methods in a First Network Node 111 (e.g., Location Server)

Example embodiments in the first network node 111:
- (In some but not all examples) Receiving (in unsolicited way or upon a request from the first network node 111) from a third network node 113 its capability related to supporting UE 120 SRS switching for positioning.
- Determining that UL positioning will be performed for a UE 120
- (In some examples) Obtaining SRS switching capability from the UE 120. This can comprise capabilities in switching retuning time, UL CA capability, bandwidth capability, etc. this can be used by the first network node 111 to e.g. derive the need and configuration for the positioning assistance data (to be transmitted to the measuring nodes) based on SRS switching.
- Obtaining SRS switching configuration and SRS configuration for the UE 120 (e.g., from the second network node 112 and/or determining one or more parameters for SRS switching and SRS configuration by itself or based on a message from another node such as O&M or SON).
- (In some but not all examples) suggest or configure at least one SRS switching or SRS configuration parameter by sending a message to the second network node 112
- Sending SRS switching and SRS configuration for the UE 120 to one or more of the third network node 113*s* to enable positioning measurements in the third network node 113(*s*) based on SRS transmitted by the UE 120 on at least one carrier without PUSCH
- Receiving one or more measurement results from one or more of the third network nodes 113.
- Using the received measurement results for determining the UE 120 location, e.g., based on UTDOA positioning method or a multi-lateration techniqUE 120.

In addition to the above steps, the first network node 111 (Location Server or measuring node) obtains UL measurement results from various bandwidth parts and determines a quality characteristic (e.g., the accuracy level or uncertainty) for the result associated with the part of the bandwidth or a quality characteristic for the part of the bandwidth itself where the measurement was performed (e.g., based on other measurements and/or reports from other UE 120*s* such as CQI reports). Based on this characteristic, the network node may process the measurements accordingly, e.g., prioritize or select good (e.g., quality is above a threshold) measurements and deprioritize or drop poor-quality measurements, prior to using them for positioning. A network node may also apply a function to the measurements over multiple parts of the bandwidth performed at the same mearing node/location for the same UE 120, e.g., a function may be average( ), median( ) or a certain percentile such as 90th or 95th percentile, weighted average( ), min( ), max( ), etc. In another example, during the processing or during UE 120 position calculation, poor-quality measurements may be assigned a lower weight while better-quality measurements may be assigned a higher weight.

The first network node 111 may also, upon collecting all configured UL measurements for the UE 120 from the measuring node or upon collecting sufficient amount of measurements for the UE 120 positioning, indicate to the second network node 112 (serving BS) that the UE 120 may be configured to stop performing SRS switching and corresponding SRS transmissions.

Figure 7A:
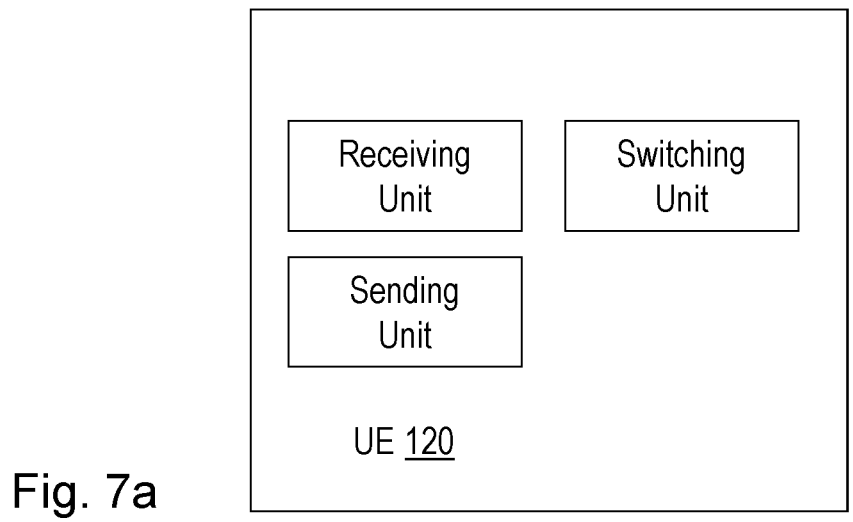
FIGS. 7 a and b are a schematic block diagram illustrating embodiments of a UE.
Figure 7B:
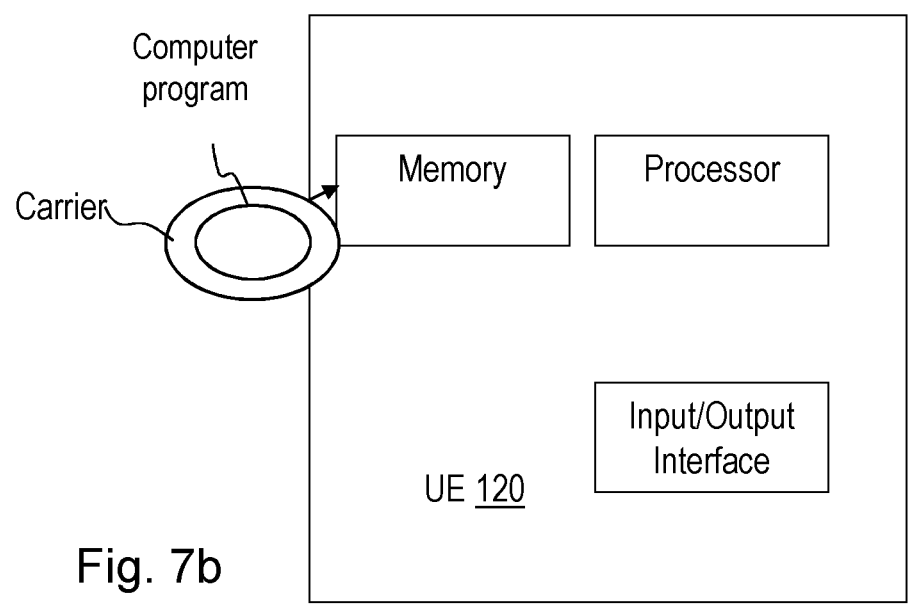
Figure 8A:
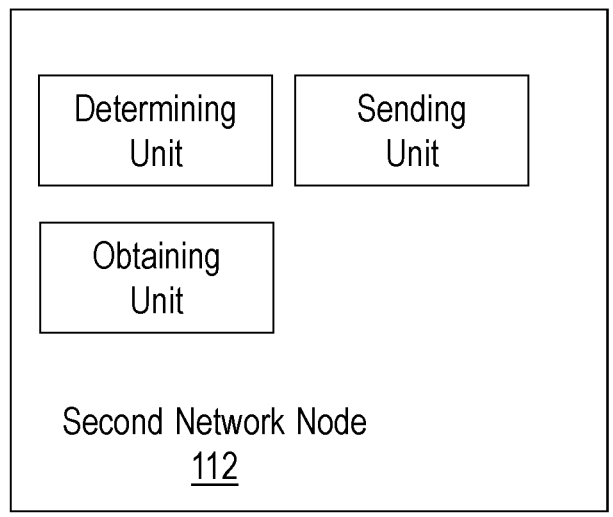
FIGS. 8 a and b are a schematic block diagram illustrating embodiments of a second network node.
Figure 8B:
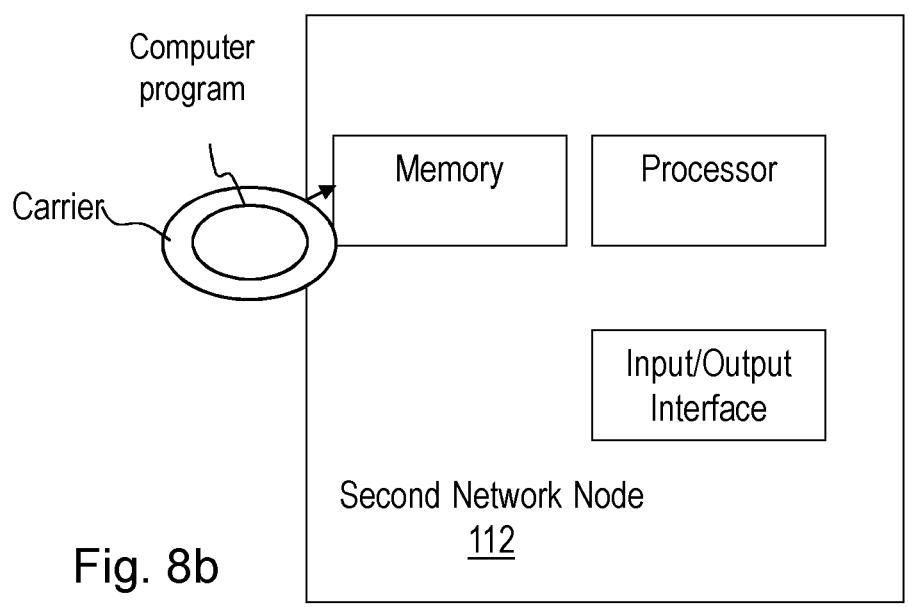
Figure 9A:
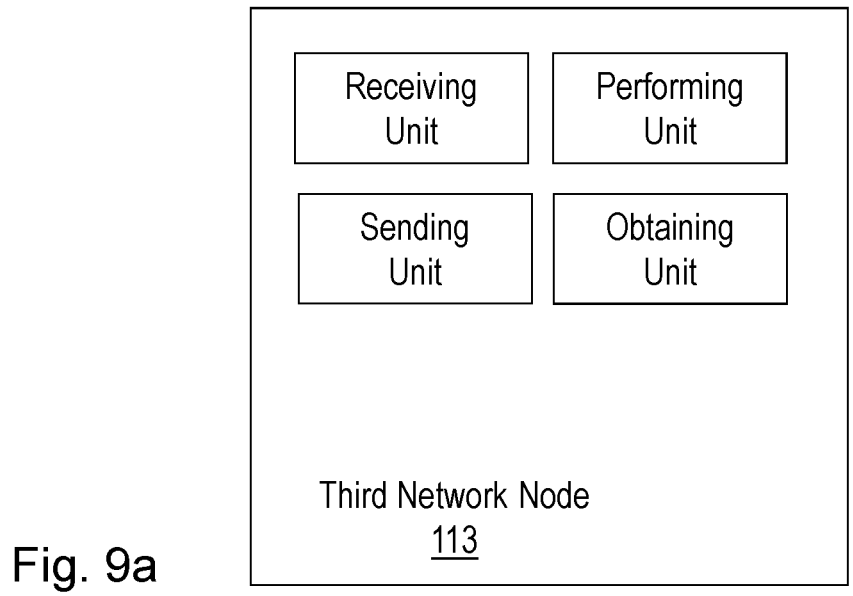
FIGS. 9 a and b are a schematic block diagram illustrating embodiments of a third network node.
Figure 9B:
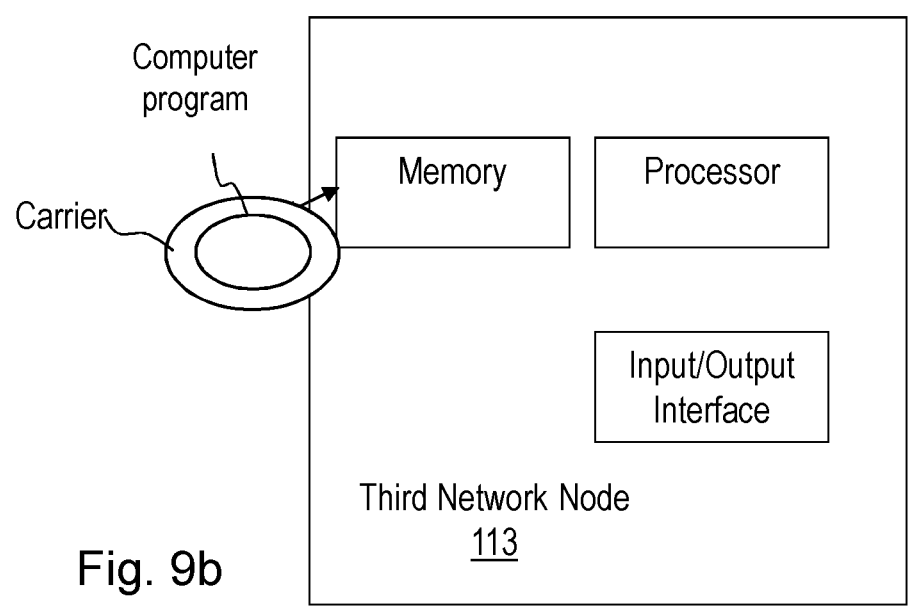
Figure 10A:
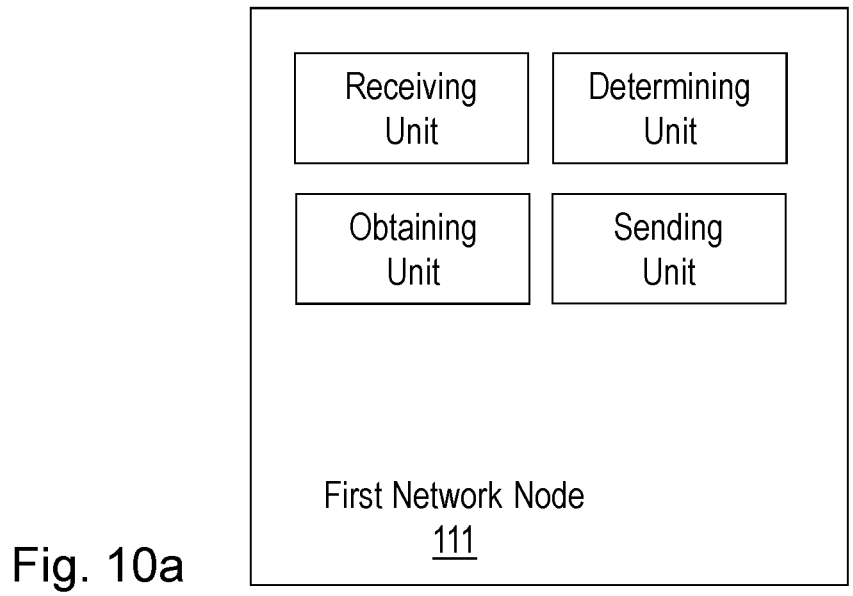
FIGS. 10 a and b are a schematic block diagram illustrating embodiments of a first network node.
Figure 10B:
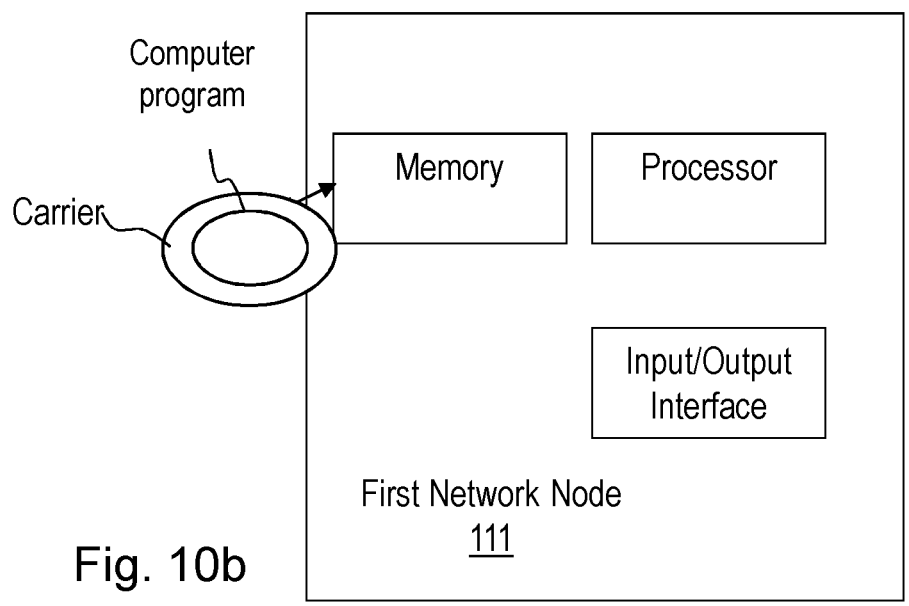

FIGS. 7*a* and 7*b* show an example of the UE 120, FIGS. 8*a* and 8*b* show an example of the second network node 112, FIGS. 9*a* and 9*b* show an example of the third network node 113 and FIGS. 10*a* and 10*b* show an example of the first network node 111.

The UE 120 and the first, second and third network node 111, 112, 113 may comprise a respective input and output interface configured to communicate with each other, see FIGS. 7*b*, 8*b*, 9*b* and 10*b*. The input and output interface may comprise a wireless receiver (not shown) and a wireless transmitter (not shown).

The UE 120 comprises a receiving unit, a sending unit, and a switching unit as depicted in FIG. 7*a*.

The second network node 112 comprises a determining unit, a sending unit, and an obtaining unit as depicted in FIG. 8*a*.

The third network node 113 comprises a receiving unit, a sending unit, a performing unit, and an obtaining unit as depicted in FIG. 9*a*.

The first network node 111 comprises a receiving unit, a sending unit, a determining unit, and an obtaining unit as depicted in FIG. 10*a*.

The embodiments herein may be implemented through a respective processor or one or more processors, such as the processor of a processing circuitry in the UE 120 and the first, second and third network node 111, 112, 113 depicted in FIGS. 7-10 together with computer program code for performing the functions and actions of the embodiments herein. The program code mentioned above may also be provided as a computer program product, for instance in the form of a data carrier carrying computer program code for performing the embodiments herein when being loaded into the UE 120 and the first, second and third network node 111, 112, 113. One such carrier may be in the form of a CD ROM disc. It is however feasible with other data carriers such as a memory stick. The computer program code may furthermore be provided as pure program code on a server and downloaded to the UE 120 and the first, second and third network node 111, 112, 113.

The UE 120 and the first, second and third network node 111, 112, 113 may further comprise respective a memory comprising one or more memory units. The memory comprises instructions executable by the processor in the UE 120 and the first, second and third network node 111, 112, 113.

The memory is arranged to be used to store e.g. information, data, configurations, and applications to perform the methods herein when being executed in the UE 120 and the first, second and third network node 111, 112, 113.

In some embodiments, a respective computer program comprises instructions, which when executed by the at least one processor, cause the at least one processor of the UE 120 and the first, second and third network node 111, 112, 113 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the UE 120 and the first, second and third network node 111, 112, 113, described above may refer to a combination of analog and digital circuits, and/or one or more processors configured with software and/or firmware, e.g. stored in the UE 120 and the first, second and third network node 111, 112, 113, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Some example Embodiments numbered 1-30 are described below. The following embodiments refer among other things to FIG. 2-10.

Embodiment 1. A method performed by a User Equipment, UE, 120 e.g. for transmitting UL signals, for positioning purpose, which UE 120 may be served by a second network node 112 in a wireless communications network 100 the method comprising in any suitable order, any one or more out of:
receiving 302 from the second network node 112 a UL signal switching configuration, and a UL signal configuration to transmit UL signal for positioning purpose on one or more carriers where the UE 120 does not transmit user data e.g. PUSCH,
receiving 303 from the second network node 112 a UL signal switching order, e.g. via an aperiodic trigger in DCI, or derived from a periodic configuration.
switching 304 to at least one carrier where the UE 120 does not transmit user data e.g., PUSCH, to transmit UL signals for positioning purpose, and
switching back 305 to a carrier where the UE 120 transmits user data e.g., PUSCH,
wherein the UL signals e.g. may be represented by SRS, RACH, DMRS or PT-RS, wherein the positioning may be represented by UL positioning or UTDOA.

Embodiment 2. The method according to embodiment 1, further comprising:
sending 301 to any one out of the second network node 112 or a first network node 111 information about the capability of the UE 120 related to UL signal switching for positioning e.g. UL positioning or UTDOA.

Embodiment 3. A computer program comprising instructions, which when executed by a processor, causes the processor to perform actions according to any of the embodiments 1-2.

Embodiment 4. A carrier comprising the computer program of embodiment 3, wherein the carrier is one of an electronic signal, an optical signal, an electromagnetic signal, a magnetic signal, an electric signal, a radio signal, a microwave signal, or a computer-readable storage medium.

Embodiment 5. A method performed by a second network node 112 e.g. for handling UL signals to be transmitted by a User Equipment, UE, 120 for positioning purpose, which UE 120 may be served by the second network node 112 in a wireless communications network 100, the method comprising in any suitable order, any one or more out of:
determining 402 that the UE 120 needs to transmit UL signals for positioning purpose, e.g., based on a message from first network node 111 such as a Location Server,
determining 403 for the UE 120 a UL signal switching configuration, and a UL signal configuration to transmit UL signal for positioning purpose on one or more carriers where the UE 120 does not transmit user data e.g. PUSCHcarriers, e.g., based on at least: one or more pre-defined parameters for UL signal switching and UL signal configuration for positioning, the UL signal switching capability of the UE 120, the UE 120 Bandwidth, BW, and/or CC/CA related capability information, capability of at least one third network node 113 such as its ability to receive UL signals from the UE 120 on a certain CC, UL positioning measurement requirements, a message from first network node 111 or message from another network node such as O&M or SON suggesting/configuring at least one parameter value for UL signal switching or UL signal for positioning, etc.
sending 404 to at least one out of the first network node 111 or a third network node 113 information about the decided a UL signal switching configuration, and a UL signal configuration to transmit UL signal for positioning purpose on one or more carriers where the UE is not transmitting user data e.g. PUSCH, which information further may comprise at least one UL signal switching related parameter,
sending 405 to the UE 120 the decided a UL signal switching configuration, and UL signal configuration to transmit UL signal for positioning purpose on one or more carriers where the UE 120 does not transmit user data e.g. PUSCH
sending 406 to the UE 120 a UL signal switching order to switch to at least one carrier where the UE 120 does not transmit user data e.g., PUSCH, to transmit UL signals for positioning purpose, the order may e.g. be sent e.g. via an aperiodic trigger in DCI, or a configured order for periodic transmission,
wherein the UL signals e.g. may be represented by SRS, RACH, DMRS or PT-RS, wherein the positioning may be represented by UL positioning or UTDOA.

Embodiment 6. The method according to embodiment 5, further comprising:
obtaining 401, from the UE 120, information about the capability of the UE 120 related to UL signal switching for positioning, e.g. UL positioning, which information e.g. comprises capabilities in switching retuning time, UL CA capability, bandwidth capability, etc., which information may be used by the second network node 112 to, e.g. derive the need and configuration for the UL signal transmissions and UL signal switching.

Embodiment 7. The method according to embodiment 5 or 6, further comprising:
sending 401 information about the decided a UL signal switching configuration for positioning purpose to be configured in the UE 120, another network node such as e.g. a neighbor BS or O&M, SON, etc.

Embodiment 8. A computer program comprising instructions, which when executed by a processor, causes the processor to perform actions according to any of the embodiments 5-7.

Embodiment 9. A carrier comprising the computer program of embodiment 8, wherein the carrier is one of an electronic signal, an optical signal, an electromagnetic signal, a magnetic signal, an electric signal, a radio signal, a microwave signal, or a computer-readable storage medium.

Embodiment 10. A method performed by a third network node 113 e.g. for measuring UL signals transmitted by a User Equipment, UE, 120 for positioning purpose, in a wireless communications network 100, the method comprising in any suitable order, any one or more out of:

- obtaining 502 for the UE 120 a UL signal switching configuration, and a UL signal configuration to transmit UL signal for positioning purpose on one or more carriers where the UE does not transmit user data e.g., PUSCH carriers, e.g., based on a message from the first network node 111 and/or second network node 112,
- based on the obtained UL signal switching configuration, and UL signal configuration to transmit UL signal for positioning purpose on one or more carriers where the UE does not transmit user data e.g. PUSCH, receiving 503 UL signals from the UE 120, and performing 504 a positioning measurement based on UL signals transmitted by the UE 120 on a carrier where the UE 120 does not transmit user data e.g., PUSCH.
- sending 505 the result of the positioning measurement to a first network node 111, e.g. directly or indirectly via another network node, e.g., send to the second network node 112 or another network node associated with the third network node 113 such as a node controlling an LMU or a BS co-located with LMU, which will further send it to the first network node 111.
- wherein the UL signals e.g. may be represented by SRS, RACH, DMRS or PT-RS, wherein the positioning may be represented by UL positioning or UTDOA.

Embodiment 11. The method according to embodiment 10, further comprising:

- sending 501 to the first network node 111, information about the capability of the third network node 113 to support UE UL signal switching for positioning purpose, e.g. in unsolicited way or upon a request from the first network node.

Embodiment 12. A computer program comprising instructions, which when executed by a processor, causes the processor to perform actions according to any of the embodiments 10-11.

Embodiment 13. A carrier comprising the computer program of embodiment 12, wherein the carrier is one of an electronic signal, an optical signal, an electromagnetic signal, a magnetic signal, an electric signal, a radio signal, a microwave signal, or a computer-readable storage medium.

Embodiment 14. A method performed by a first network node 111 e.g. for determining a position of a User Equipment, UE, 120 in a wireless communications network 100, the method comprising in any suitable order, any one or more out of:

- determining 602 that positioning will be performed for the UE 120.
- obtaining 604 for the UE 120 a UL signal switching configuration, and a UL signal configuration to transmit UL signal for positioning purpose on one or more carriers where the UE does not transmit user data e.g. PUSCH e.g., from the second network node and/or determining one or more parameters for SRS switching and SRS configuration by itself or based on a message from another node such as O&M or SON,
- sending 606 to one or more third network nodes 113, the obtained UL signal switching configuration, and UL signal configuration for the UE 120, to enable positioning measurements in the one or more third network nodes 113 based on UL signals transmitted by the UE 120 on one or more carriers where the UE does not transmit user data e.g., PUSCH,
- determining 607 the location of the UE 120, based on received UL results of positioning measurements from the one or more third network nodes 113, e.g., further based on a UTDOA positioning method or a multi-lateration technique,
- wherein the UL signals e.g. may be represented by SRS, RACH, DMRS or PT-RS, wherein the positioning may be represented by UL positioning or UTDOA.

Embodiment 15. The method according to embodiment 14, further comprising:

- receiving 601 from the third network node 111, information about the capability of the third network node 113 to support UE UL signal switching for positioning, e.g. in unsolicited way or upon a request from the first network node.

Embodiment 16. The method according to any of the embodiments 14-15, further comprising:

- receiving 603 information about the capability of the UE 120 related to UL signal switching for positioning e.g. comprising capabilities in switching retuning time, UL CA capability, bandwidth capability, etc. this can be used by the first network node to e.g. derive the need and configuration for the positioning assistance data to be transmitted to the measuring nodes based on UL signal switching.

Embodiment 17. The method according to any of the embodiments 14-16, further comprising:

- sending 605 a message to the second network node 112, which message configures or suggests to configure the second network node 112 with at least one UL signal switching or UL signal configuration parameter comprised in the message.

Embodiment 18. A computer program comprising instructions, which when executed by a processor, causes the processor to perform actions according to any of the embodiments 14-17.

Embodiment 19. A carrier comprising the computer program of embodiment 12, wherein the carrier is one of an electronic signal, an optical signal, an electromagnetic signal, a magnetic signal, an electric signal, a radio signal, a microwave signal, or a computer-readable storage medium.

Embodiment 20. A User Equipment, UE, 120 e.g. for transmitting UL signals, for positioning purpose, which UE 120 may be served by a second network node 112 in a wireless communications network 100, the UE 120 being configured to, any one or more out of:

- receive, e.g. by means of a receiving unit in the UE 120, from the second network node 112 a UL signal switching configuration, and a UL signal configuration to transmit UL signal for positioning purpose on one or more carriers where the UE 120 does not transmit user data e.g. PUSCH,
- receive, e.g. by means of the receiving unit in the UE 120, from the second network node 112 a UL signal switching order, e.g. via an aperiodic trigger in DCI, or derived from a periodic configuration.
- switch, e.g. by means of a switching unit in the UE 120, to at least one carrier where the UE 120 does not transmit user data e.g., PUSCH, to transmit UL signals for positioning purpose, and switch back, e.g. by means of the switching unit in the UE 120, to a carrier where the UE 120 transmits user data e.g., PUSCH, wherein the UL signals e.g. may be adapted to be represented by SRS, RACH, DMRS or PT-RS, wherein the positioning may be adapted to be represented by UL positioning or UTDOA.

Embodiment 21. The UE 120 according to embodiment 20, further being configured to:

Send, e.g. by means of a sending unit in the UE 120, to any one out of the second network node 112 or a first network node 111 information about the capability of the UE 120 related to UL signal switching for positioning e.g. UL positioning or UTDOA.

Embodiment 22. A second network node 112 e.g. for handling UL signals to be transmitted by a User Equipment, UE, 120 for positioning purpose, which UE 120 may be served by the second network node 112 in a wireless communications network 100, the second network node 112 being configured to, any one or more out of:

determine, e.g. by means of a determining unit in the UE 120, that the UE 120 needs to transmit UL signals for positioning purpose, e.g., based on a message from first network node 111 such as a Location Server, determine, e.g. by means of the determining unit in the second network node 112, for the UE 120 a UL signal switching configuration, and a UL signal configuration to transmit UL signal for positioning purpose on one or more carriers where the UE 120 does not transmit user data e.g. PUSCHcarriers, e.g., based on at least: one or more pre-defined parameters for UL signal switching and UL signal configuration for positioning, the UL signal switching capability of the UE 120, the UE 120 Bandwidth, BW, and/or CC/CA related capability information, capability of at least one third network node 113 such as its ability to receive UL signals from the UE 120 on a certain CC, UL positioning measurement requirements, a message from first network node 111 or message from another network node such as O&M or SON suggesting/configuring at least one parameter value for UL signal switching or UL signal for positioning, etc.

send, e.g. by means of a sending unit in the second network node 112, to at least one out of the first network node 111 or a third network node 113 information about the decided a UL signal switching configuration, and a UL signal configuration to transmit UL signal for positioning purpose on one or more carriers where the UE is not transmitting user data e.g. PUSCH, which information further may be adapted to comprise at least one UL signal switching related parameter, send, e.g. by means of the sending unit in the second network node 112, to the UE 120 the decided a UL signal switching configuration, and UL signal configuration to transmit UL signal for positioning purpose on one or more carriers where the UE 120 does not transmit user data e.g. PUSCH send, e.g. by means of the sending unit in the second network node 112, to the UE 120 a UL signal switching order to switch to at least one carrier where the UE 120 does not transmit user data e.g., PUSCH, to transmit UL signals for positioning purpose, the order may e.g. be adapted to be sent e.g. via an aperiodic trigger in DCI, or a configured order for periodic transmission, wherein the UL signals e.g. may be adapted to be represented by SRS, RACH, DMRS or PT-RS, wherein the positioning may be adapted to be represented by UL positioning or UTDOA.

Embodiment 23. The second network node 112 according to embodiment 22, further being configured to:

obtain, e.g. by means of an obtaining unit in the second network node 112, from the UE 120, information about the capability of the UE 120 related to UL signal switching for positioning, e.g. UL positioning, which information e.g. may be adapted to comprise capabilities in switching retuning time, UL CA capability, bandwidth capability, etc., which information may be adapted to be used by the second network node 112 to, e.g. derive the need and configuration for the UL signal transmissions and UL signal switching.

Embodiment 24. The second network node 112 according to embodiment 22 or 23, further being configured to:

send, e.g. by means of the sending unit in the second network node 112, information about the decided a UL signal switching configuration for positioning purpose to be configured in the UE 120, another network node such as e.g. a neighbor BS or O&M, SON, etc.

Embodiment 25. A third network node 113 e.g. for measuring UL signals transmitted by a User Equipment, UE, 120 for positioning purpose, in a wireless communications network 100, the third network node 113 being configured to, any one or more out of:

obtain, e.g. by means of an obtaining unit in the third network node 113, for the UE 120 a UL signal switching configuration, and a UL signal configuration to transmit UL signal for positioning purpose on one or more carriers where the UE does not transmit user data e.g., PUSCH carriers, e.g., based on a message from the first network node 111 and/or second network node 112, based on the obtained UL signal switching configuration, and UL signal configuration to transmit UL signal for positioning purpose on one or more carriers where the UE does not transmit user data e.g. PUSCH, receive, e.g. by means of a receiving unit in the third network node 113, UL signals from the UE 120, and perform, e.g. by means of a performing unit in the third network node 113, a positioning measurement based on UL signals transmitted by the UE 120 on a carrier where the UE 120 does not transmit user data e.g., PUSCH.

send, e.g. by means of a sending unit in the third network node 113, the result of the positioning measurement to a first network node 111, e.g. directly or indirectly via another network node, e.g., sent to the second network node 112 or another network node associated with the third network node 113 such as a node controlling an LMU or a BS co-located with LMU, which will further send it to the first network node 111.

wherein the UL signals e.g. may be adapted to be represented by SRS, RACH, DMRS or PT-RS, wherein the positioning may be adapted to be represented by UL positioning or UTDOA.

Embodiment 26. The third network node 113 according to embodiment 25, further being configured to:

send, e.g. by means of the sending unit in the third network node 113, to the first network node 111, information about the capability of the third network node 113 to support UE UL signal switching for positioning purpose, e.g. in unsolicited way or upon a request from the first network node.

Embodiment 27. A first network node 111 e.g. for determining a position of a User Equipment, UE, 120 in a wireless communications network 100, the first network node 111 being configured to, any one or more out of:

- determine, e.g. by means of a determining unit in the first network node 111, that positioning will be performed for the UE 120,
- obtain, e.g. by means of an obtaining unit in the first network node 111, for the UE 120 a UL signal switching configuration, and a UL signal configuration to transmit UL signal for positioning purpose on one or more carriers where the UE does not transmit user data e.g. PUSCH e.g., from the second network node and/or determining one or more parameters for SRS switching and SRS configuration by itself or based on a message from another node such as O&M or SON,
- send, e.g. by means of a sending unit in the first network node 111, to one or more third network nodes 113, the obtained UL signal switching configuration, and UL signal configuration for the UE 120, to enable positioning measurements in the one or more third network nodes 113 based on UL signals transmitted by the UE 120 on one or more carriers where the UE does not transmit user data e.g., PUSCH,
- determine, e.g. by means of the determining unit in the first network node 111, the location of the UE 120, based on received UL results of positioning measurements from the one or more third network nodes 113, e.g., further based on a UTDOA positioning method or a multi-lateration technique,
- wherein the UL signals e.g. may be adapted to be represented by SRS, RACH, DMRS or PT-RS, wherein the positioning may be adapted to be represented by UL positioning or UTDOA.

Embodiment 28. The first network node 111 according to embodiment 27, further being configured to:

- receive, e.g. by means of a receiving unit in the first network node 111, from the third network node 111, information about the capability of the third network node 113 to support UE UL signal switching for positioning, e.g. in unsolicited way or upon a request from the first network node.

Embodiment 29. The first network node 111 according to any of the embodiments 27-28, further being configured to:

- receive, e.g. by means of the receiving unit in the first network node 111, information about the capability of the UE 120 related to UL signal switching for positioning e.g. adapted to comprise capabilities in switching retuning time, UL CA capability, bandwidth capability, etc. this can be used by the first network node to e.g. derive the need and configuration for the positioning assistance data to be transmitted to the measuring nodes based on UL signal switching.

Embodiment 30. The first network node 111 according to any of the embodiments 27-29, further being configured to:

- send, e.g. by means of the sending unit in the first network node 111, a message to the second network node 112, which message is adapted to configure or suggest to configure the second network node 112 with at least one UL signal switching or UL signal configuration parameter comprised in the message.

Figure 11:
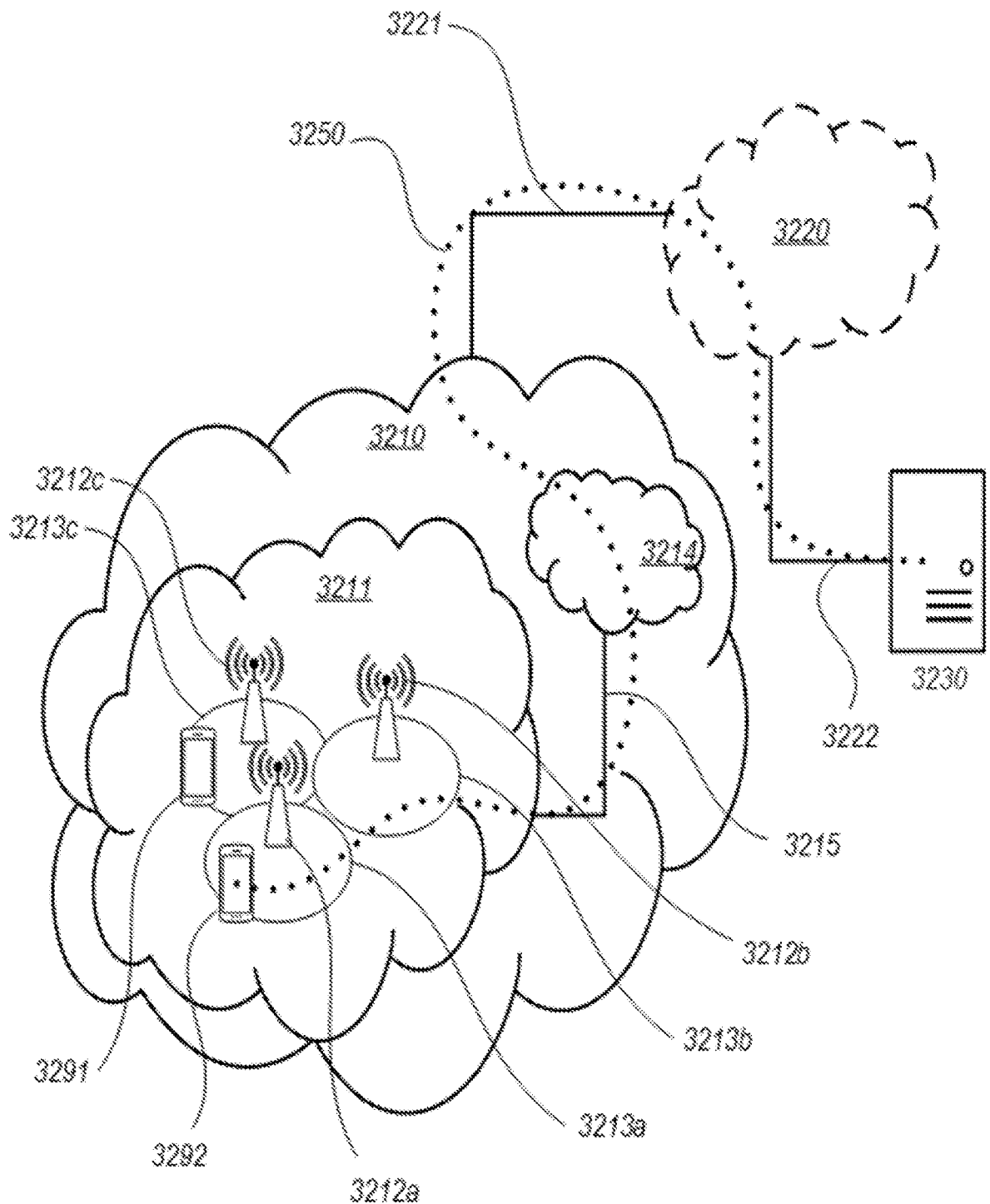
FIG. 11 schematically illustrates a telecommunication network connected via an intermediate network to a host computer.

With reference to FIG. 11, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as the source and target access node 111, 112, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 such as e.g. the UE 120, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
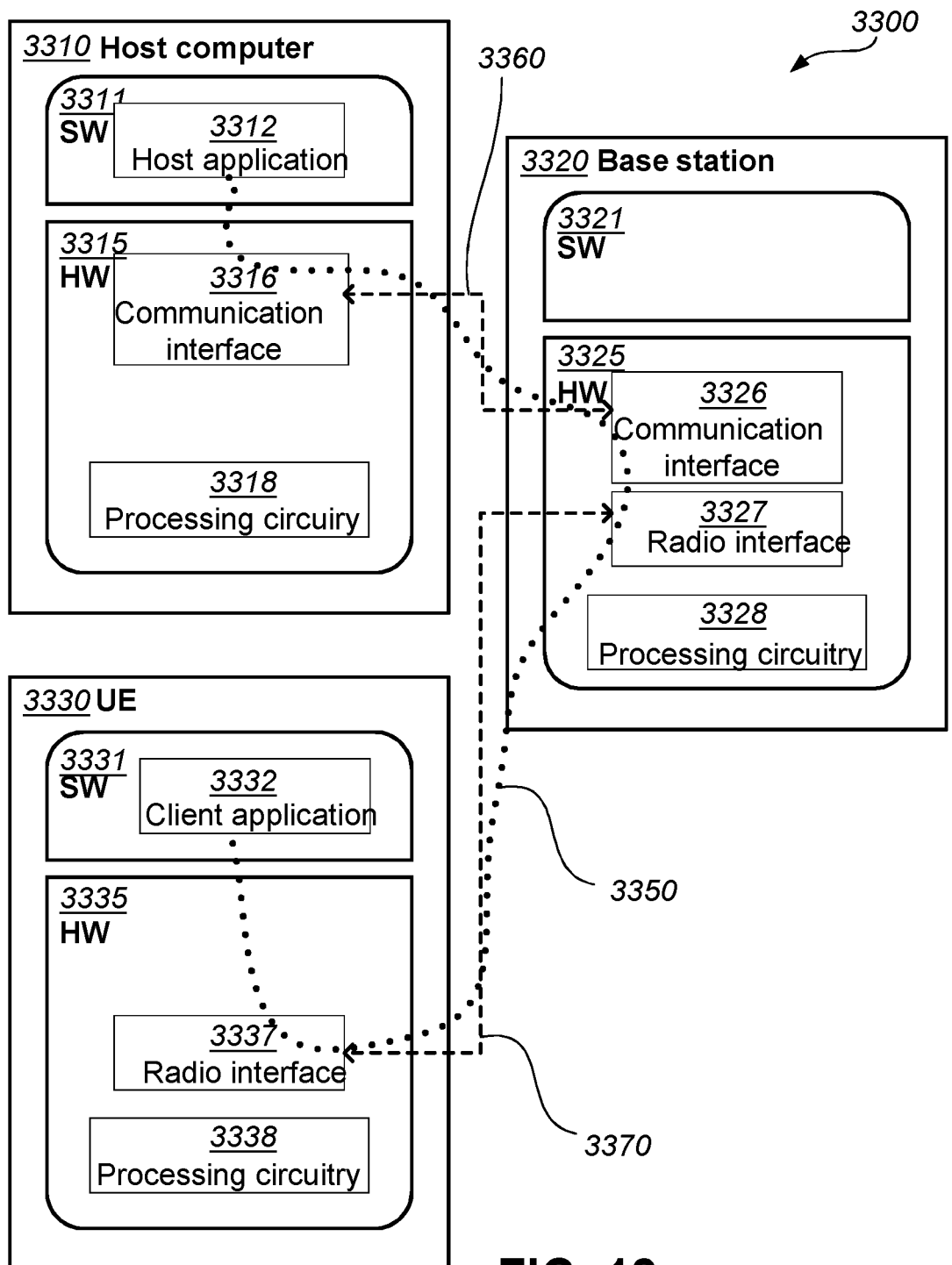
FIG. 12 is a generalized block diagram of a host computer communicating via a base station with a user equipment over a partially wireless connection.

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. The expression "embodiments described throughout this disclosure" is meant to refer to the radio-related embodiments disclosed elsewhere in the application. One or more of the various embodiments improve the performance of OTT services provided to the UE 3330 using the OTT connection 3350, in which the wireless connection 3370 forms the last segment. More precisely, the teachings of these embodiments may e.g. improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 15 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 16 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Abbreviations

Abbreviation Explanation

NR New Radio
OTDOA Observed Time Difference of Arrival
PDP Power Delay Profile
LOS Line of Sight
NLOS Non-Line of Sight
SRS Sounding Reference Signal
TDOA Time Difference of Arrival
TRS Tracking Reference Signal
UTDOA UL Time Different of Arrival

The invention claimed is:

1. A method performed by a user equipment (UE) for transmitting uplink (UL) signals for positioning purpose in a wireless communications network that includes at least first and second network nodes, the method comprising:
  receiving, from the second network node, an UL signal switching configuration and an UL signal configuration to transmit UL signals for positioning purpose on one or more carriers on which the UE is not configured to transmit user data;
  receiving from the second network node an UL signal switching order;
  based on the UL signal switching order, switching to at least one carrier on which the UE does not transmit user data, to transmit the UL signals for positioning purpose; and
  switching back to a carrier on which the UE is configured to transmit user data.

2. The method of claim 1, further comprising sending, to the second network node or the first network node, information about UE capability related to UL signal switching for positioning.

3. A non-transitory, computer-readable storage medium storing computer-executable instructions that, when executed by one or more processors of a user equipment (UE) configured to operate in a wireless communications network that includes at least first and second network nodes, configure the UE to perform operations corresponding to the method of claim 1.

4. A method performed by a second network node for handling uplink (UL) signals transmitted by a user equipment (UE) for positioning purpose in a wireless communications network that includes the second network node and at least first and third network nodes, the method comprising:
  determining that the UE needs to transmit UL signals for positioning purpose;
  determining, for the UE, an UL signal switching configuration and an UL signal configuration to transmit UL signal for positioning purpose on one or more carriers on which the UE is not configured to transmit user data;
  sending, to one or more of the first network node and the third network node, information about the determined UL signal switching configuration and the determined UL signal configuration;

sending, to the UE, the determined UL signal switching configuration and the determined UL signal configuration; and sending, to the UE, an UL signal switching order to switch to at least one carrier on which the UE is not configured to transmit user data, to transmit UL signals for positioning purpose.

5. The method of claim 4, further comprising obtaining, from the UE, information about UE capability related to UL signal switching for positioning.

6. The method of claim 4, further comprising sending, to another network node, an indication that the determined UL signal switching configuration has been or will be configured in the UE for positioning purpose.

7. A non-transitory, computer-readable storage medium storing computer-executable instructions that, when executed by one or more processors of a second network node configured to operate in a wireless communications network that also includes at least first and third network nodes, configure the second network node to perform operations corresponding to the method of claim 4.

8. A user equipment (UE) configured to transmit uplink (UL) signals for positioning purpose in a wireless communications network that includes at least first and second network nodes, the UE comprising:
one or more processors; and
a computer memory storing instructions executable by the one or more processors,
wherein execution of the instructions configures the UE to:
receive, from the second network node, an UL signal switching configuration and an UL signal configuration to transmit UL signals for positioning purpose on one or more carriers on which the UE is not configured to transmit user data;
receive from the second network node an UL signal switching order;
based on the UL signal switching order, switch to at least one carrier on which the UE does not transmit user data, to transmit the UL signals for positioning purpose; and
switch back to a carrier on which the UE is configured to transmit user data.

9. The UE according to claim 8, wherein execution of the instructions further configures the UE to send, to the second network node or the first network node, information about UE capability related to UL signal switching for positioning.

10. A second network node configured to handle uplink (UL) signals transmitted by a user equipment (UE) for positioning purpose in a wireless communications network that includes the second network node and at least first and third network nodes, the second network node comprising:
one or more processors; and
a computer memory storing instructions executable by the one or more processors,
wherein execution of the instructions configures the second network node to:
determine that the UE needs to transmit UL signals for positioning purpose;
determine, for the UE, an UL signal switching configuration and an UL signal configuration to transmit UL signal for positioning purpose on one or more carriers on which the UE is not configured to transmit user data;
send, to one or more of the first network node and the third network node, information about the determined UL signal switching configuration and the determined UL signal configuration;
send, to the UE, the determined UL signal switching configuration and the determined UL signal configuration; and
send, to the UE, an UL signal switching order to switch to at least one carrier on which the UE is not configured to transmit user data, to transmit UL signals for positioning purpose.

11. The second network node according to claim 10, wherein execution of the instructions further configures the second network node to obtain, from the UE, information about UE capability related to UL signal switching for positioning.

12. The second network node according to claim 10, wherein execution of the instructions further configures the second network node to send, to another network node, an indication that the determined UL signal switching configuration has been or will be configured in the UE for positioning purpose.

* * * * *